United States Patent
Yagawa et al.

(10) Patent No.: US 6,857,131 B1
(45) Date of Patent: *Feb. 15, 2005

(54) METHOD AND APPARATUS FOR DISPLAYING AN IMAGE AND DATA RELATED TO THE IMAGE CONDITIONED ON USER IDENTIFIER

(75) Inventors: Yuichi Yagawa, Yokohama (JP); Michio Morioka, Kashiwa (JP); Shigeki Hirasawa, Sagamihara (JP); Tadashi Kuwabara, Yokohama (JP); Tomochika Ozaki, Irvine, CA (US); Akio Yajima, Tokyo (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,487

(22) Filed: Dec. 23, 1997

(30) Foreign Application Priority Data

Dec. 25, 1996 (JP) .............................. 8-345001

(51) Int. Cl.⁷ ........................ H04N 7/173; H04N 5/445; G06F 13/00
(52) U.S. Cl. ........................ 725/112; 725/61; 348/564
(58) Field of Search ................. 348/7, 10, 12, 348/13, 563, 564, 552, 906, 1, 9, 565; 455/5.1, 2; 345/327; H04N 7/10, 7/14; G06F 13/00

(56) References Cited

U.S. PATENT DOCUMENTS 5,559,548 A * 9/1996 Davis et al. ................ 348/906
5,708,475 A * 1/1998 Hayashi et al. ............. 348/468
5,724,521 A * 3/1998 Dedrick ....................... 348/10
5,774,664 A * 6/1998 Hidary et al. .......... 395/200.48
5,774,666 A * 6/1998 Portuesi ................. 395/200.48
5,801,747 A * 9/1998 Bedard .......................... 348/1
5,959,623 A * 9/1999 Van Hoff et al. ........... 345/329
6,025,837 A * 2/2000 Matthews, III et al. ..... 725/107
6,177,931 B1 * 1/2001 Alexander et al. .......... 345/721

FOREIGN PATENT DOCUMENTS

| EP | 0742670 | 11/1996 |
| EP | 0742670 A | 11/1996 |
| WO | 9741690 | 11/1997 |

OTHER PUBLICATIONS

Microsoft Press Computer Dictionary, Third Edition, p. 198, 1995.*

* cited by examiner

*Primary Examiner*—Vivek Srivastava
(74) *Attorney, Agent, or Firm*—Antonelli, Terry, Stout & Kraus, LLP

(57) ABSTRACT

A device and method of displaying images and data on a display device. The device and method displays still and moving images in which at least one icon is associated and displayed with each image on a screen. A single screen may contain several images which change over time. As the images change so do the icons associated with them. Upon selection of an icon by a viewer, the device and method will display one of several possible advertisements or information associated with the icon. The selection of which advertisement or piece of information is based on information stored about the viewer. This information would include data concerning the viewer's age, income, address and hobbies. A list of selections made by a viewer is maintained and may be displayed at the viewer's request. The system may also force the display of advertisements if desired by advertisers.

49 Claims, 21 Drawing Sheets

FIG. 12

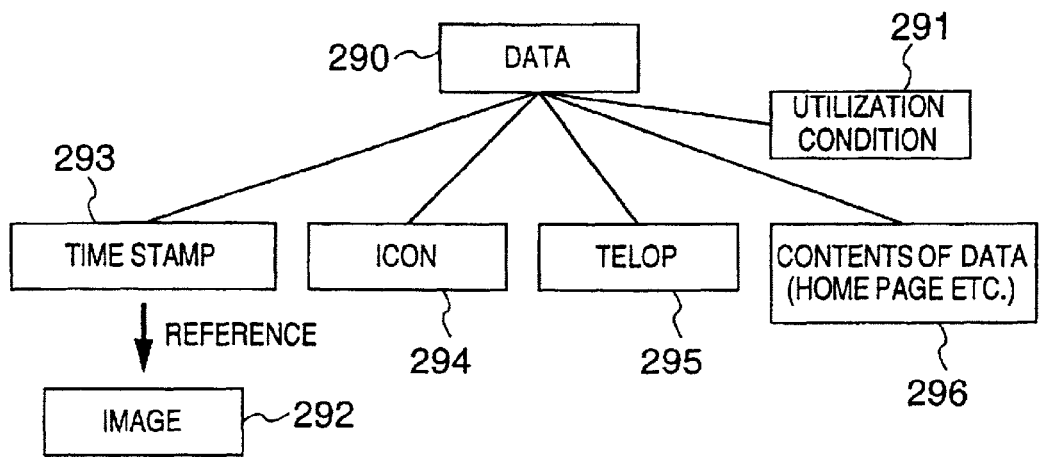

FIG. 13

| ITEM | DATA TYPE | NOTES |
|---|---|---|
| DATA id | NUMERICAL VALUE | IDENTIFIER OF DATA |
| IMAGE id | NUMERICAL VALUE | IDENTIFIER OF IMAGE OF TELEVISION PROGRAM |
| UTILIZATION CONDITION | ARRAY OF CONDITIONAL STRUCTURE | CONDITIONAL STRUCTURE= (ATTRIBUTE,ATTRIBUTE VALUE) |
| TIME STAMP (START TIME) | NUMERICAL VALUE | RELATIVE TIME FROM START TIME OF IMAGE |
| TIMESTAMP (END TIME) | NUMERICAL VALUE | RELATIVE TIME FROM START TIME OF IMAGE |
| TIME STAMP (DURATION) | NUMERICAL VALUE | DURATION OF DISPLAY OF LEAFLET (ADVERTISEMENT) |
| ICON | PICTURE | IMAGE FILE OF ICON |
| TELOP | CHARACTER STRING | CONTENTS OF TELOP (UPPER LIMIT EXISTS) |
| CONTENTS OF DATA | OPTION | HOME PAGE ETC.(HTML FORMAT) OR ACCESS METHOD OF DATA IS EXPRESSED (URL ETC.) |

FIG. 23

| | ATTRIBUTE (460) | ATTRIBUTE VALUE (461) |
|---|---|---|
| CHARACTERS | AGE | 30 |
| | SEX | MAN |
| | ADDRESS | AOBA DISTRICT, YOKOHAMA CITY |
| | ····· | ····· |
| TASTE | HOBBY | ENJOYMENT OF MUSIC, READING ENJOYMENT OF MOVING |
| | MUSIC | ROCK |
| | MOVIE | MOVIE OF HONG KONG |
| | BOOK | HISTORICAL NOVEL DETECTIVE STORY |
| | ····· | ····· |

FIG.24

| | | | CHARACTERS | | | | TASTE | | | | |
|---|---|---|---|---|---|---|---|---|---|---|---|
| ADVERTISEMENT | URL | IMPORTANCE | AGE | SEX | ADDRESS | ... | HOBBY | MUSIC | MOVIE | BOOK | ... |
| ADVERTISEMENT 1 | http://www.hitachi.co.jp/index.html | 80 | 20~35 | MAN | DON'T CARE | ... | DON'T CARE | DON'T CARE | DON'T CARE | DON'T CARE | ... |
| ADVERTISEMENT 2 | http://www.hitachi.co.jp/index.html | 80 | 20~25 | WOMAN | DON'T CARE | ... | DON'T CARE | DON'T CARE | DON'T CARE | DON'T CARE | ... |
| ADVERTISEMENT 3 | http://www.hitachi.co.jp/index.html | 80 | 20~65 | DON'T CARE | KANAGAWA PREFECTURE | ... | DON'T CARE | DON'T CARE | DON'T CARE | DON'T CARE | ... |
| ADVERTISEMENT 4 | http://www.hitachi.co.jp/index.html | 60 | DON'T CARE | DON'T CARE | DON'T CARE | ... | ENJOYMENT OF MUSIC | ROCK | DON'T CARE | DON'T CARE | ... |
| ADVERTISEMENT 5 | http://www.hitachi.co.jp/index.html | 60 | DON'T CARE | DON'T CARE | DON'T CARE | ... | ENJOYMENT OF MOVIE | DON'T CARE | MOVIE OF HONG KONG | DON'T CARE | ... |
| ADVERTISEMENT 6 | http://www.hitachi.co.jp/index.html | 50 | DON'T CARE | DON'T CARE | DON'T CARE | ... | READING | DON'T CARE | DON'T CARE | DETECTIVE STORY | ... |
| ADVERTISEMENT 7 | http://www.hitachi.co.jp/index.html | 50 | DON'T CARE | DON'T CARE | DON'T CARE | ... | READING | DON'T CARE | DON'T CARE | HISTORICAL NOVEL | ... |
| ADVERTISEMENT 8 | http://www.hitachi.co.jp/index.html | 40 | DON'T CARE | DON'T CARE | KANAGAWA PREFECTURE TOKYO METROPOLIS | ... | ENJOYMENT OF MUSIC | ROCK | DON'T CARE | DON'T CARE | ... |
| ... | ... | ... | ... | ... | ... | ... | ... | ... | ... | ... | ... |

METHOD AND APPARATUS FOR DISPLAYING AN IMAGE AND DATA RELATED TO THE IMAGE CONDITIONED ON USER IDENTIFIER

BACKGROUND OF THE INVENTION

The present invention relates to a method and an apparatus for displaying an image and data obtained from a broadcast or other medium, and more particularly, to an image and data display method and apparatus for displaying data classified or individualized for each user synchronized with the image.

Further, the present invention relates to a method of providing information (hereinafter referred to as contents) on a network together with information of goods, including advertisements, and more particularly, to a method of providing the information of goods classified or individualized for each user in relation to the contents.

Recently services of broadcasting data such as characters and pictures, other than images, have been developed to broadcast character data using air waves and data delivery services such as satellite or a CATV. In future, when broadcasting becomes digital, a large amount of data can be transmitted simultaneously with the transmission of images using data compression techniques and the data multiplexing techniques and accordingly it is believed that these data broadcasting services will increase extensively.

The displaying methods used in the conventional data broadcasting will now be described below.

Regarding character broadcasting, data is multiplexed in an unoccupied area of the surface waves and air being transmitted and electric waves received by a receiving terminal are then divided into images and data. Since the data broadcast is not related to the images broadcast, the data is displayed separately from the display images. For example, as shown in FIG. 8, a display screen is divided into two portions so that an image is displayed in one of the portions and data is displayed in the other. Generally, that images and data are displayed in a display screen alternately by a remote control operation. Another display method waits until reception of the data is completed before displaying it while an image is viewed. Since a temporary memory area is also provided in the terminal, it is used to receive and store the data for later viewing.

In any event, since the data is independent from the image, the data can be viewed at any time regardless of the image starting from the time of completing the reception of the data.

Further, in the service known as interactive television, data related to an image is transmitted together with the image. The data is multiplexed in the unoccupied area of the terrestrial and air waves to be transmitted in the same manner as the character broadcasting. When data related to a scene being viewed arrives at the terminal, a specific icon is displayed at a corner of the image to notify a viewer of the arrival. When the viewer designates display of the data, the display screen is divided into two portions as shown in FIG. 8 and the image and the data is displayed at the same time. There is also a method that displays an image and data on one display screen alternately.

However, recently, Internet television capable of viewing a home page (discussed below) on the Internet has been developed. The display method thereof is substantially identical with the character broadcasting and the home page is displayed without quite synchronizing with an image. Generally, the display method thereof involves the method of displaying a television image and the home page on two display screens at the same time as shown in FIG. 8. Also, a method of displaying the television image and the home page on one display screen alternately is used. Further, in recent television programs, an address of a home page is often displayed to the viewers, requiring that the user input the address in order to view the home page by means of the Internet television.

The prior art pertinent to the interactive television and the Internet television is described in "The Age of Digital Televisions Has Come !", Nikkei Trendy, '96, Oct., pp. 54–73 issued by Nikkei Home Co. in detail.

Next, there is the World Wide Web (WWW) on the Internet for providing contents on a network. In the WWW, contents provided therein are named in the home page. The home page is generally described by the script language known as HTML (Hyper Text Markup Language). Further, in HTML, the relationship among the home pages is defined as a hyper link. The user designates a WWW server and a home page by a unified format named the URL (Uniform Resource Locator). When the WWW server receives a request from the user, the WWW server transmits a proper home page to the user.

In a general method of providing information on goods in the WWW, advertisements (information of goods) relating to the home page are displayed in the same home page. Since the information of goods relative to the home page required by the user is provided, the power of appealing to the user so that the user buys goods is increased. Generally, the home page and the advertisement often correspond to each other in advance.

An information service considered by the present invention is described below using a definite example.

Recently, with improvement of the performance of hardware and the diffusion of network, the interactive information service can be easily realized. The interactive information service mentioned here is the information service having bidirectional characteristics in which not only can an information provider send information to the user one-sidedly but also the user can access the information provider positively. For example, the conventional television broadcasting and the radio broadcasting are one-way media from a television program provider to viewers and listeners, while the facsimile and telephone which are bidirectional media are used to realize the interactive information service such as a viewer participating in a program. Further, an experimental television program employing the Internet and the communication using other communication methods instead of the facsimile and telephone has also started. Henceforth, it is believed that information services using television broadcasting and the Internet together will increased with the boom of the Internet.

In such a bidirectional information service, an effective and efficient inquiry from the information provider to the users is important. Unless an inquiry is first made by the information provider, interaction is also not started. Considering the merits of the information provider, it is desirable that large effects are attained by the inquiry with reduced labor.

Considering how to provide information effectively, information (which is sometimes referred to as data since the information is contrasted with images) is sent together with images and accordingly it is desirable that both of the information and the images have relationship. Utilization methods include, for example, in a television program a questionnaire on the program is sent simultaneously or more detailed information of goods is sent in a television commercial. When a television terminal capable of accessing to the Internet or a CD-ROM is considered, an automatic access program to an address of a home page or data in the CD-ROM may be merely sent. In this manner, when the access method from the image to the information is defined, there is a merit that the viewers are attracted by the image and move to the bidirectional media immediately. At the same time, the viewers can know detailed information pertinent to the image easily.

As a method of providing information effectively, there is considered important that information suitable for each individual user is sent directly. For example, in a current television commercial and television shopping, the same image information is provided to all of the users uniformly. However, when it is realized that information of goods having appeal in fact can be provided to each individual user together with images on the basis of customer information (character and taste of users), the efficiency of marketing is improved remarkably. The customer information includes characters and taste of the users. At the same time, since information suitable to the user's Interest is sent to the user, the efficiency of reference to the information is also increased. Such individualization technique is called mass customization or one-to-one marketing. Further, when different information is sent to each user, the information provider's load is increased and a load of the network is also heavy. Accordingly, the users are classified by common characteristics so that information is provided to each classified user. The concept "classification" is also contained in the mass customization.

Problems in case where the above-mentioned interactive information service is applied to the conventional image and data display method are now described.

First, in character broadcasting, relationships are not specifically defined between images and data. Similarly, it is not premised that relationships exists between television images and home pages on Internet television. Accordingly, there was no problem even if the images and data were displayed in different display screens independently. Further, in the character broadcasting, even if the method of displaying data on the image was performed, it was sufficient only by notifying that preparation of display was completed after reception of data had been finished. However, in the information service pertinent to the present invention, since data relative to the images is treated, it is necessary to notify the users which scene of the images the data corresponds to.

However, data relative to images is displayed together with the images in the current interactive television. Accordingly, the display method in which a scene of the images to which the relative data corresponds is transmitted to the user. However, since it is not a display method in which the mass customization is premised and the same data is delivered to the users, data to be viewed synchronized with the images is all the same for the users.

SUMMARY OF THE INVENTION

It is an object of the present invention to solve the above problems in order to realize the above information service by providing an image and data display method in which the users are first notified that data classified or individualized for each user exists synchronized with images and the data is displayed synchronized with the images.

Further, in order to cause the users to access to relative data, existence of the relative data must be understood more easily. Since it is considered that a plurality of data are also sometimes related to a specific image scene, measures for identifying differences among the plurality of data easily are required. Accordingly, it is another object of the present invention to provide an image and data display method of notifying users which data is related to the image plainly.

In addition, since the images are media that change with time, the users have a desire to view the image continuously without disturbing the image by any obstacle. Accordingly, it is another object of the present invention to provide an image and data display method which ensures that relative data is provided to users without losing the continuity of images.

Furthermore, since the interactive information service described above aims at typical families, it is necessary that the users' terminals can be operated simply and used easily. Accordingly, it is another object of the present invention to provide an image and data display method which is simple to operate and easy to use.

Further, in order to spread the interactive information service widely into typical families, it is indispensable that the users' terminals be inexpensive. Accordingly, it is another object of the present invention to provide an image and data display method which can use inexpensive terminals.

Further, in the interactive information service, it is important that an information provider's intention is satisfied sufficiently so that information is given to the user of the target exactly. Accordingly, it is another object of the present invention to provide an image and data display method which can reflect the information provider's intentions.

Next, in the service of providing information of goods in the WWW, generally, the home page and the advertisement are often provided to the user in a one-to-one correspondence manner. Accordingly, the service of providing a classified or individualized advertisement to each user cannot be realized as it is.

It is another object of the present invention to provide and display information on goods classified or individualized for each individual user in relation to contents while the user refers to the contents. Particularly, in the case where information of a plurality of goods is selected and provided to a target user at the same time, the present invention relates to a method of solving any conflict that results.

According to the present invention, a method of displaying an image and data relative to a specific scene of the image, comprises (a) the step of selecting, when one of a plurality of images is selected, at least one data relative to the image simultaneously, (b) the step of determining a display condition including display and non-display of the relative data on the basis of a previously determined user identifier and utilization condition, (c) the step of determining, when a plurality of relative data are determined to be able to be displayed in the step (b), display priorities among the relative data, (d) the step of displaying a picture and character string indicative of contents of each relative data on the basis of the display priorities determined in the step (c) together with the image during display of the specific scene, (e) the step of displaying, when a picture and character string is selected, relative data corresponding to the selected picture and character string on the basis of the display condition, and (f) the step of displaying, when a command for displaying a list is inputted, a list of pictures and character strings displayed until now and, when at least one in the list is selected, displaying relative data corresponding to the selected picture and character string on the basis of the display condition.

In steps (a) and (b), the data relative to the image being displayed and customized for the user is selected. Further, in step (d), the user can be notified by the picture and the character string indicative of contents of the relative data that the relative data exists in the image scene. In addition, in the step (e), the relative data can be displayed synchronized with the image in response to the user's request.

Moreover, in the step (b), the display condition of the picture and the character string is determined on the basis of the utilization condition such as a size of the display terminal of the user. Similarly, in the step (e), when a plurality of relative data exist in the same image scene, the display priority such as the order of displaying the relative data is determined. In step (d), since the picture and the character string are displayed on the basis of the display priority and the display condition, the existence of the relative data can be transmitted to the user plainly.

Further, in the step (f), when the user inputs a command to display a list, a list of pictures and character strings displayed to the present is displayed. The user can select any one in the list and refer to the relative data. That is, the user can first view only the images continuously and refer to the relative data slowly later. Since there is provided a mode that the picture and the character string cannot be displayed, the mode can cope with the need of the user who wants to view only the picture on the whole image.

Furthermore, in the present invention, in the step (e), the whole display screen for displaying the relative data is divided into at least one image display area and at least one data display area. There is provided a mode for simultaneously displaying the image and the data relative to the image and a mode for displaying at least one piece of relative data on the whole display screen. When a command for changing over the display is input, the display mode is changed among the image display mode, the image and data simultaneous display mode and the data display mode. The user can select the mode in accordance with the user's purpose. In addition, since the operation of selecting the mode can be made by the button of the remote controller, there can be provide the function that the operation is simple and easy.

Further, in the present invention, in step (f), the number of relative data displayed in the list is limited and selection of relative data is made in accordance with the display priority when the limitation is exceeded.

Accordingly, the memory area can be kept small and consequently the cost of the terminal can be reduced.

Moreover, in the present invention, there is provided a mode in which the information provider can forcedly display the picture and the character string indicative of contents of the relative data. Even if the user sets the picture and the character string of the relative data not to be displayed, the picture and the character string are necessarily displayed for the relative data in the forced display mode and accordingly the intentions of the information provider can be satisfied sufficiently such that information can be transmitted to the user of the target exactly.

In the information-of-goods providing method according to the present invention, when the user selects contents, information of goods relative to the contents is also selected at the same time and whether the information of goods is displayed or not is determined for each user on the basis of the display condition of the information of goods. When a plurality of information items of goods can be displayed by the above process, the display priorities are determined among the information items of goods. Further, during display of the contents, data indicative of the contents of the information of goods is displayed together with the contents on the basis of the display priorities determined by the above processing. In addition, there is provided a memory area for temporarily storing all information of goods selected for each user and including the information of goods which cannot be displayed during reference of the contents by the user since the display priority thereof is low and the temporarily stored information of goods can be displayed in accordance with the user's request.

BRIEF DESCRIPTION OF THE DRAWINGS

FIG. 12 is an explanatory diagram showing a data model in an image and data display method and apparatus according to an embodiment of the present invention;

FIG. 13 is an explanatory diagram showing a data structure of an image and data display method and apparatus according to an embodiment of the present invention;

FIG. 23 is an explanatory diagram showing a data structure of user individual information;

FIG. 24 is an explanatory diagram showing a data structure of an advertisement list.

DESCRIPTION OF THE PREFERRED EMBODIMENTS

An embodiment of the present invention is now described with reference to the accompanying drawings.

Figure 2:
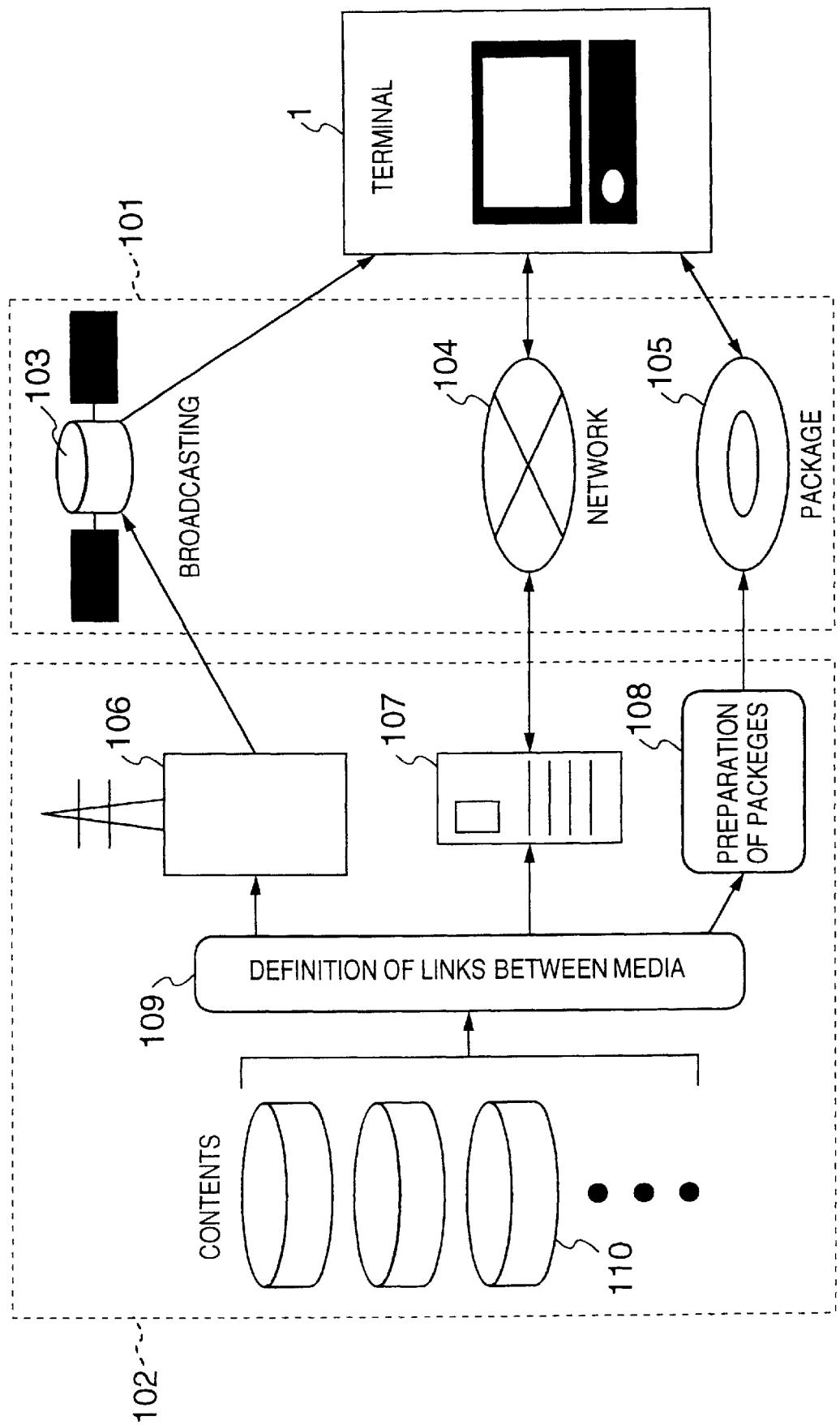
FIG. 2 is a schematic diagram illustrating a system configuration of an interactive information service according to an embodiment of the present invention.

FIG. 2 illustrates a system configuration of an interactive information service according to the present invention. The system includes a subsystem 102 on the side of the information provider, an information transmission media 101 and a user terminal 1. As information transmission media 101, broadcasting media such as terrestrials waves, satellite broadcasting 103 and CATV, network media such internet 104 and package media such as CD-ROMs 105 and DVD (Digital Video Disk) are considered. In the subsystem 102 on the side of the information provider, a module 109 processes various contents 110 such as images and data into structure suitable for the transmission media and defines links among the media. The links among the media means the reference relationship among information sent to the users by means of the transmission media. For example, access can be changed from an image produced by means of broadcasting media to data on a home page on the Internet or a CD-ROM related to the image. Information is sent from a broadcasting station 106 to the satellite broadcasting 103, from an Internet server 107 to the Internet 104, and from a package preparing subsystem 108 to the CD-ROM 105. The user terminal 1 receives the information to refer thereto.

Figure 1:
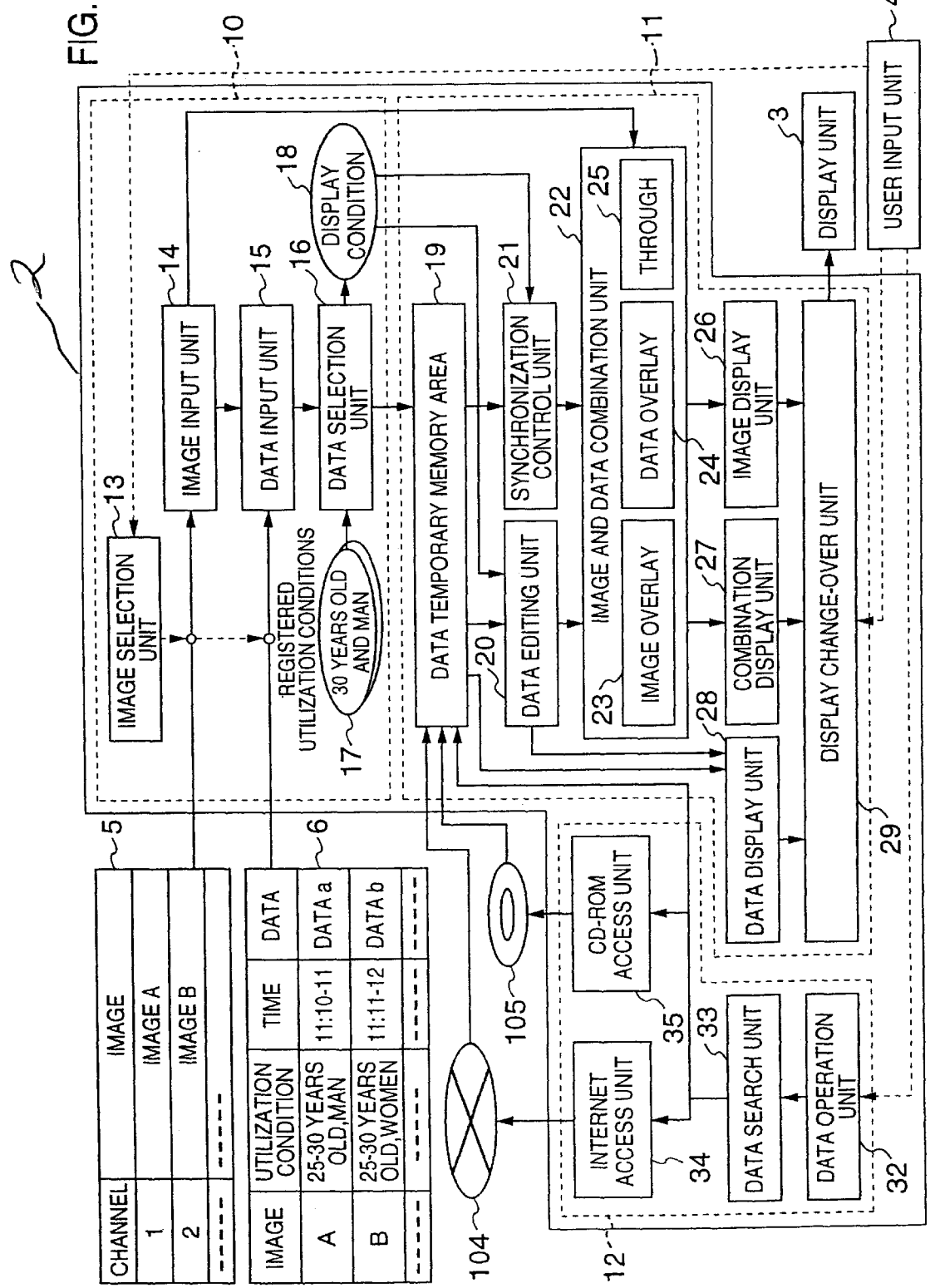
FIG. 1 is a schematic diagram illustrating a functional block of an image and data display method and apparatus according to an embodiment of the present invention.

FIG. 1 is a functional block diagram schematically illustrating of the user terminal 1. The user terminal 1 includes a body apparatus 2, a display unit 3 and user input means 4. The body apparatus 2 receives at least one image source 5 and at least one data 6. A transmitting method of image and data and a structure of data are described later.

The body apparatus 2 can be divided broadly into a functional block 10 for selectively receiving an image and data relative to the image, a functional block 11 for displaying the image and the relative data is synchronized with each other, and a functional block 12 for accessing to an external resource such as the internet and the CD-ROM. First, the functional block 10 selects at least one image in an image selection unit 13 on the basis of a command from the user input means 4. The selection is the same as usual selection of a channel in a television, while the present invention is characterized in that data relative to the image is selected at the same time as the selection of the image. For example, when it is assumed that the user selects an image A of the channel number 1, data a and b relative to the image A are selected. Then, the image is sent through an image input unit 14 to an image and data combination unit 22 of the functional block 11.

On the other hand, the relative data is sent through a data input unit 15 to a data selection unit 16. The data selection unit 16 of the present invention is characterized to further select relative data on the basis of previously determined utilization condition 17. For example, when it is assumed that the user is a man of 30 years old and the utilization condition 17 is registered to that effect, the relative data sent to the data selection unit 16 is compared with the utilization condition, so that the data a is selected. The condition of a plurality of kinds such as address, hobby, character and the like besides age and sex can be registered as the utilization condition. At the same time, since an identifier of each individual user is also registered, the identifier of the user is set in the utilization condition on the side of the relative data as information to be sent to only a particular user. With such structure, the information provider side can narrow the users down to provide information effectively and at the same time since the user side can refer to only data relative to the specific user himself, the efficiency of reference to information is increased.

At the same time, when the condition concerning utilization environment is registered, the display condition 18 of relative data is prescribed on the basis of the condition. For example, processing so that a display area of the relative data conforms to the size of the display screen is considered. Further, the method that the display condition is prescribed for each utilization environment condition and the user terminal side selects the prescribed condition such that the relative data conforms to a display condition a under a condition A.

It is necessary that the functional block 11 displays an image and data so that the user can understand the relationship of the image and the data. Accordingly, the functional block 11 provides display means of three kinds including: an image display unit 26; a combination display unit 27; and a data display unit 28. Examples of pictures by the display means are described in detail with reference to FIGS. 4 to 7. Briefly, the image display unit 26 displays an image mainly on the whole display screen. The combination display unit 27 displays an image and data together. The data display unit displays only data on the whole display screen. Further, display screens are changed over by means of a display change-over unit 29 in response to a command from the user input means 4.

As far as the image display unit 26 outputs only an image to the display unit 3, the relation of the image and data cannot be transmitted to the user. Accordingly, the present invention is further characterized by the provision of a synchronization control unit 21 and the image and data combination unit 22 in order to display data relative to a specific scene of an image by an icon or telop indicative of contents thereof on the image. Particularly, the image and data combination unit 22 includes data overlay processing 24 for combining to superpose an icon or telop on an image. The icon is used to show a kind of relative data. For example, the icon represents that the relative data is present information, limited information for members or the like. Further, the telop represents a headline of the relative data. It is desirable that contents of the telop can be understood at a glance like a big headline of a newspaper.

At the same time, a data editing unit 20 is provided in order to edit the icon and the telop in advance on the basis of the display condition 18 when the display condition 18 is prescribed in the relative data.

For example, when the size of a display screen is small, the size of the icon and the telop is also created similarly small and the length of the telop is created short. As described above, the icon and the telop can be used to notify the existence of the data relative to the image to the users plainly and effectively.

Through processing 25 in the image and data combination unit 22 displays an image as it is without superposing the icon and telop on the image. The through processing is used when there is no data relative to the image or when the user turns off display of the icon and telop.

The combination display unit 27 displays the image and the relative data together. The combination display method includes a method of superposing the image on the relative data by image overlay processing 23, a method of superposing data on the image by the data overlay processing 24, a method of dividing a display screen of the display unit 3 into an image display area and a data display area and the like. Examples of pictures are described with reference to FIGS. 4 to 7. The present invention is characterized in that when relative data is present in a specific scene of the displayed image, the icon and telop are displayed to be superposed on the image in the same manner as the image display unit 26 and when the user inputs a command for data display, relative data is displayed in the data display area. A benefit is realized since the user can view images of continuous media continuously without disturbing the images by displaying data and can refer to relative data on the same display screen simultaneously.

The data display unit 28 displays only relative data. In this case, when the display condition 18 is prescribed, the data editing unit 20 processes and edits data so that the data conforms to the condition. The functional block 11 includes a data temporary memory area 19, in which relative data selected by the data selection unit 16 is stored temporarily. The relative data is sent to each processing unit in response to a request from each display unit.

Relative data is described briefly. In the present invention, as the relative data, characters and images having a so-called link structure exist similar home page on the Internet. Operation on a data display picture corresponds to operation of following links. Accordingly, the functional block 12 includes a data operation unit 32 for designating a link destination and a data search unit 33 for searching for the link destination. Further, the present invention is characterized in that relative data is not only sent but also taken out from transmission media such as the Internet 104 and the CD-ROM 105. Accordingly, the data search unit requests searching not only the data temporary memory area 19 but also an Internet access unit 34 and a CD-ROM access unit 35 for data in accordance with information relative to an access method of relative data. The Internet access unit 34 receives an URL (Uniform Resource Locator) of a home page on the Internet 104 and obtains the home page corresponding to the URL to store it in the data temporary memory area 19. The CD-ROM access unit 35 has substantial identical processing, while since there is a possibility that an access method is different for each CD-ROM title, it is necessary to previously determine an access protocol to the CD-ROM used in the information service. In the embodiment, a home page is described as a representative of contents of data relative to images hereinafter.

Figure 3:
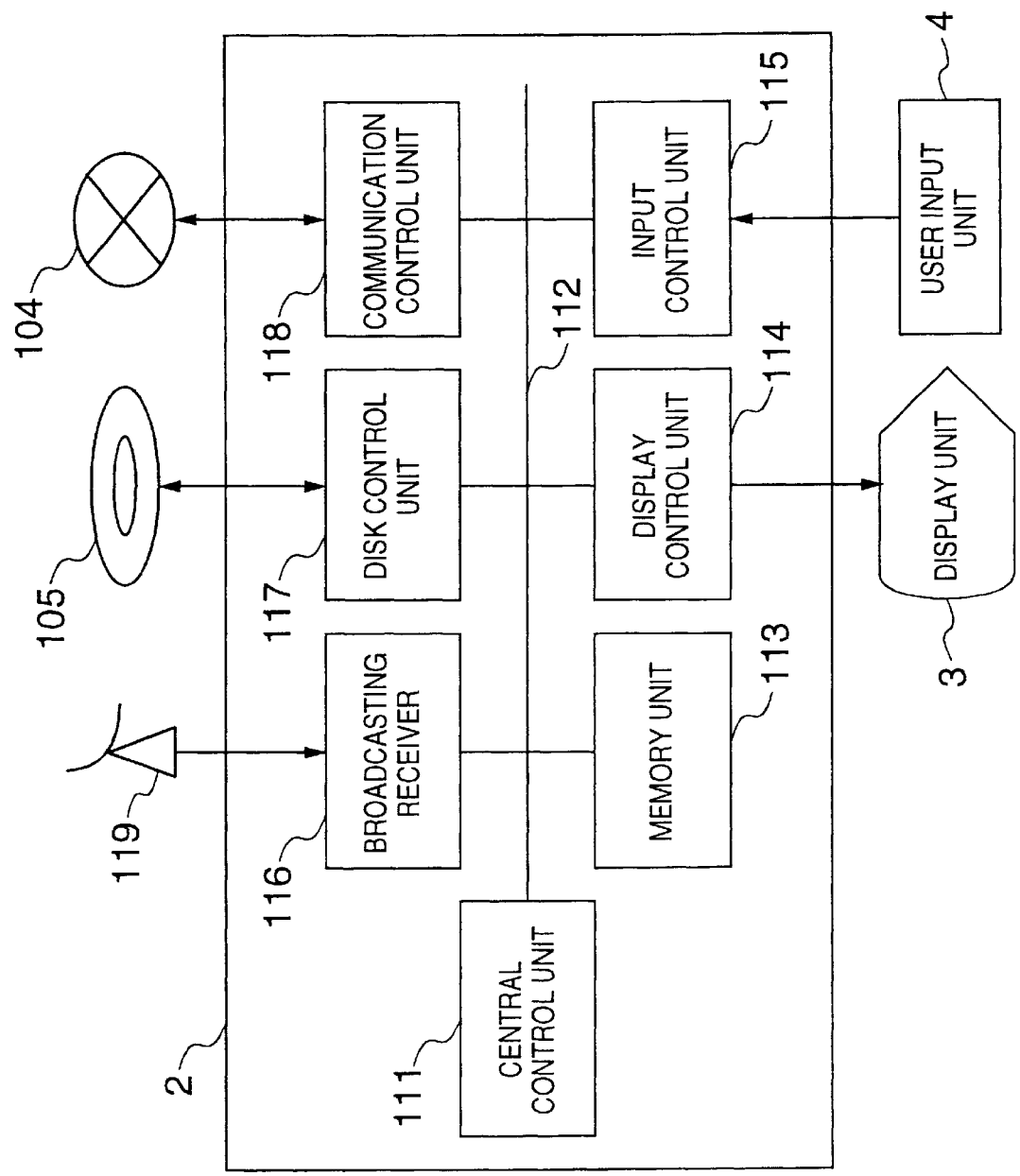
FIG. 3 is a schematic diagram illustrating a hardware configuration of an image and data display method and apparatus according to an embodiment of the present invention.

FIG. 3 schematically illustrates a hardware of the user terminal 1. The user terminal 1 includes the body apparatus 2, the display unit 3 and the user input unit 4. Further, the body apparatus 2 includes a central controller 111, a memory unit 113, a display control unit 114, an input control unit 115, a broadcasting receiving unit 116, a disk control unit 117 and a communication control unit 118 connected to one another through a bus 112. The memory unit 113 includes the data temporary memory area shown in FIG. 1 and stores a processing program and data therein. The display control unit 114 controls output to the display unit 3. The input control unit 115 receives the command input from the user through the user input means 4 and sends the command to the central controller. The central controller interprets contents of the command and executes an instruction for realizing the command. The broadcasting receiving unit 116 receives images and data sent from a broadcasting station through an antenna 119. The disk control unit 117 accesses data in package media such as the CD-ROM 15 or the like. Similarly, the communication control unit 118 accesses to various information sources such as home pages on the internet 4 and the like.

FIGS. 4 to 7 show the transition of display pictures of an embodiment according to the present invention.

Figure 4:
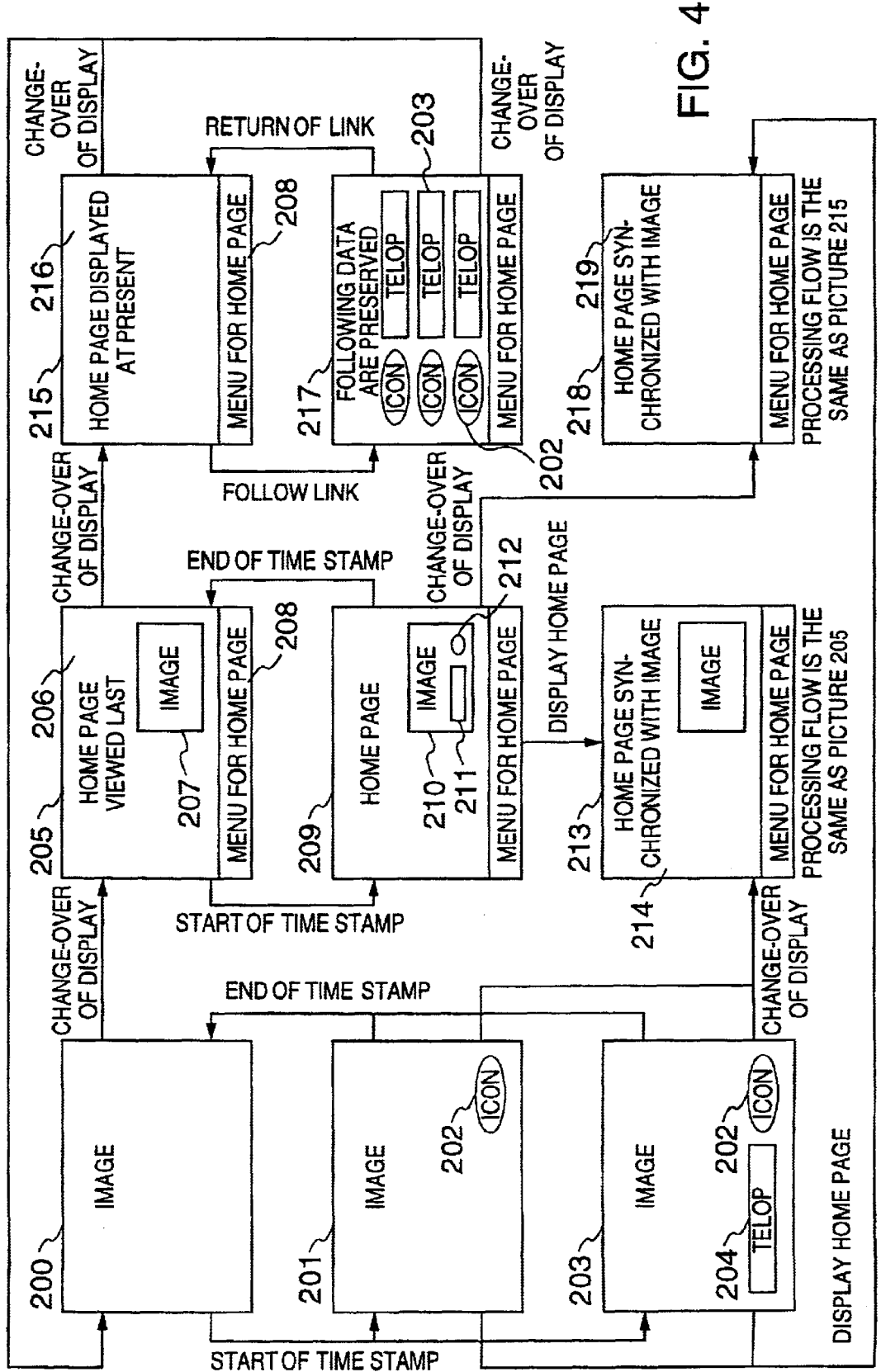
FIG. 4 is an explanatory diagram showing display pictures of an image and data display method and apparatus according to an embodiment of the present invention.

The transition of pictures is described with reference to FIG. 4 as an example. First, only an image is displayed in a display picture 200. When a time stamp is started during display of the image, the picture changes to a display picture 201 or 203. Incidentally, the time stamp is a structure for relating a specific image scene to data relative to the scene and represents a time from a beginning of the related image scene to the termination thereof. When any command is not input by the user during the time stamp, the display picture 201 or 203 is returned to the display picture 200.

An icon 202 representative of a kind of related data is displayed in the display picture 201 and a telop 204 representative of contents of related data is displayed together with the icon. The icon 202 and the telop 204 are included in the related data. The present invention is characterized in that the icon and the telop indicate that there is data related to the image scene. Further, in the present invention, since data classified or individualized for each user is displayed, it is characterized that the icon or the telop is used to notify a kind or contents of data to the user plainly. In this embodiment, whether the telop is displayed or not can be set by the information provider. In addition, there is a mode in which the user can turn off display of the icon and the telop so that the user enjoys the image without disturbing the image by the icon or the telop. However, there is related data which is desired to be necessarily notified to the user depending on contents of the related data and accordingly there is provided a forced display mode of the icon and the telop.

Next, in the state of the display picture 200, when the user instructs to change over the display, the display is moved to a display picture 205, so that a home page viewed last or a default home page is displayed. On the other hand, when the user instructs to change over the display in the state of the display picture 201 or 203, the display is moved to a display picture 213 in which a home page 214 relative to the image is displayed. As described above, the embodiment is characterized in that when the change-over of the display is instructed during display of the icon or telop, the home page relative to the image scene is displayed.

Further, in the display pictures 205 and 213, reduced image 207 of a currently selected image is displayed to be superposed on the home page. As described above the present invention is characterized in that the user can view the image continuously without disturbing the image by display of data and at the same time the user can refer to the relative data.

In addition, the reduced image 207 usually has the same function as the display picture 200 of the image. Accordingly, in the display picture 205, when a time stamp is started, the display picture is moved to a display picture 9 in which a telop 211 and an icon 212 are displayed on a reduced image 210. In this state, when the user instructs to change over the display, the display picture is then moved to the display picture 213 in which a home page synchronized with the image is displayed. In this manner, since the user can be notified that there is new data relative to the image during simultaneous display of the image and the relative data, the user can refer to the relative data immediately.

Next, when the display is instructed to be changed over again in the state of the display picture 205, the display picture is moved to a display picture 215 in which the reduced image 207 disappears from the picture and only the currently displayed home page is displayed. Similarly, when the display is instructed to be changed over in the state of the display picture 209, the display picture is moved to a display picture 218 in which the reduced image 210 disappears and at the same time a home page synchronized with the image is displayed. This display mode is suitable for the case where the user wants to view the home page without disturbing it by the image on the contrary to the combined display mode of the image and the home page. Incidentally, operation of the home page is made by a menu 208. Further, when the display is instructed to be changed over again, the display picture is returned to the display picture 200 in which only the image is displayed.

The menu 208 has an item of "re-display of automatically preserved icon and telop". That is, icons and telops viewed by the user until now are automatically preserved as a list and when there is an indication from the user, the list is converted into a home page format (that is, format of HTML (Hyper Text Markup Language) to provide it to the user. For example, when the indication to that effect is inputted in the display picture 215, the display picture is moved to a display picture 217. A list of icons and telops automatically preserved until now is displayed in the display picture 217. In the present invention, it is supposed that there is a need that the user overlooks relative data while the user is full of enthusiasm about the image and the user wants to view the relative data again later, and the above function of displaying the list of icons and telops is provided to cope with such need. Further, when all of icons and telops are preserved, the capacity of the memory unit 113 becomes insufficient at any memory capacity. Accordingly, priority is given to the relative data so that unnecessary data can be eliminated from the data having the lower priority. For example, when it is assumed that the priority is determined in accordance with the cost required for provision of information, the data is eliminated in order of a lower cost.

Figure 5:
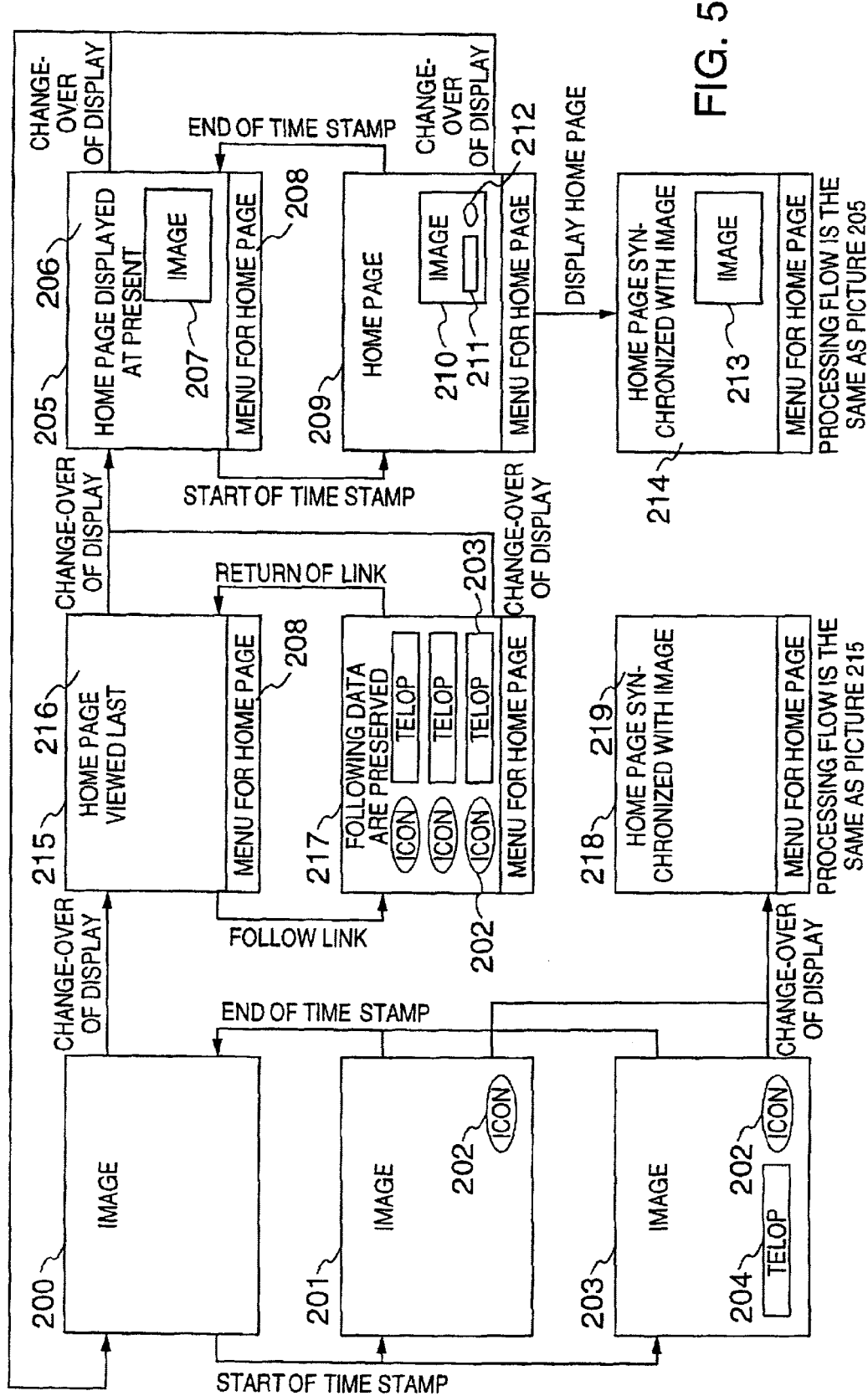
FIG. 5 is an explanatory diagram showing different display pictures of an image and data display method and apparatus according to an embodiment of the present invention.
Figure 6:
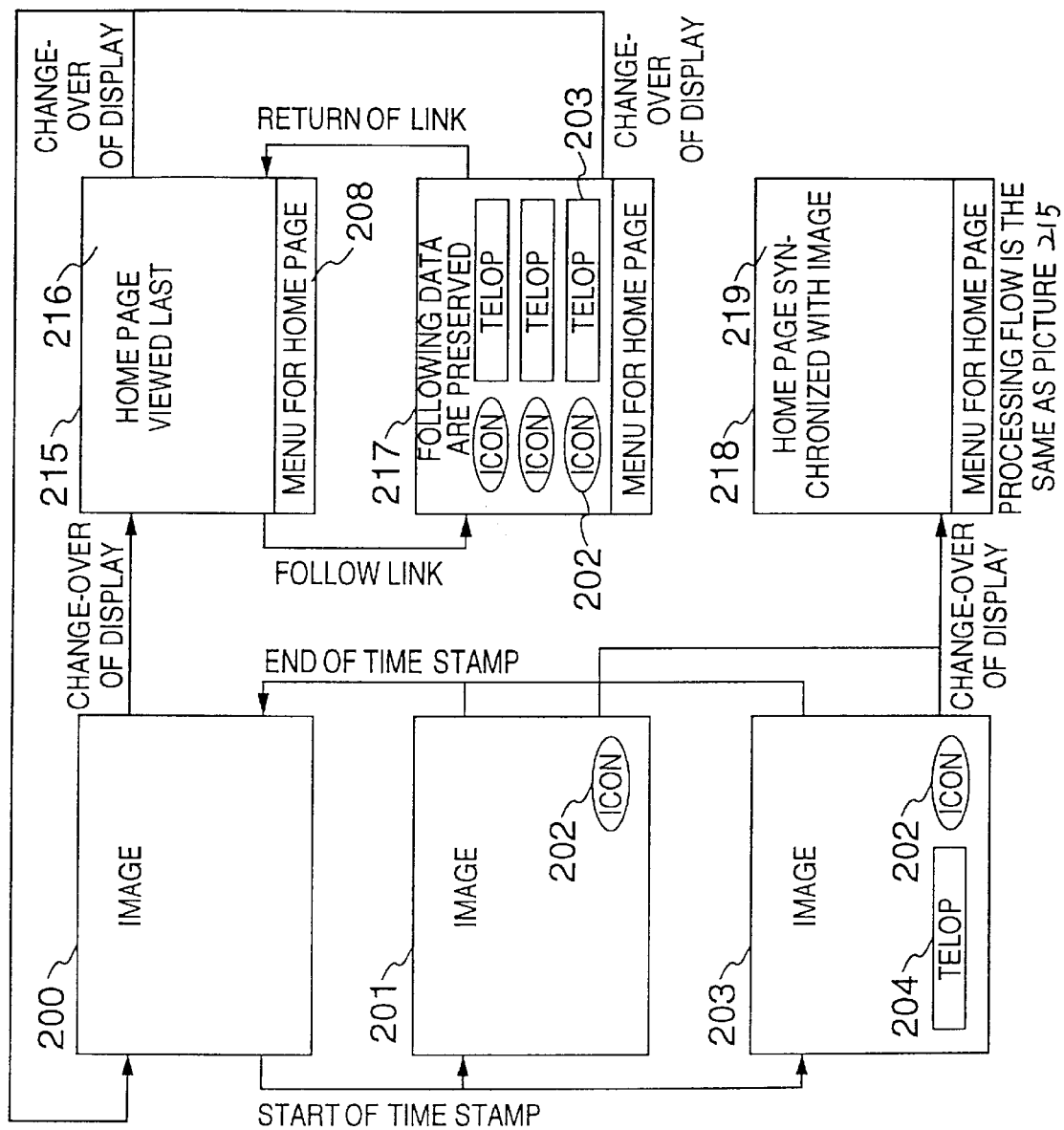
FIG. 6 is an explanatory diagram showing different display pictures of an image and data display method and apparatus according to an embodiment of the present invention.

As described above, the transition of pictures has been described with reference to FIG. 4. There are three kinds of display pictures including the display mode of only the image, the combined display mode of the image and the home page and the display mode of only the home page. In FIG. 4, the modes are changed in order of the image display mode, the combined display mode and the home page display mode and return to the image display mode. On the other hand, FIG. 5 shows a different example of display pictures of the present invention, in which the modes are changed in order of the image display mode, the home page display mode and the combined display mode. The transition of pictures of FIG. 5 is suitable for mainly viewing the home page. Similarly, FIG. 6 also shows a different example of display pictures of the present invention, while the picture example does not contain the combined display mode. In order to display the combined image and home page, it correspondingly cost. However, the picture example of FIG. 6 can suppress the cost low.

Figure 7A:
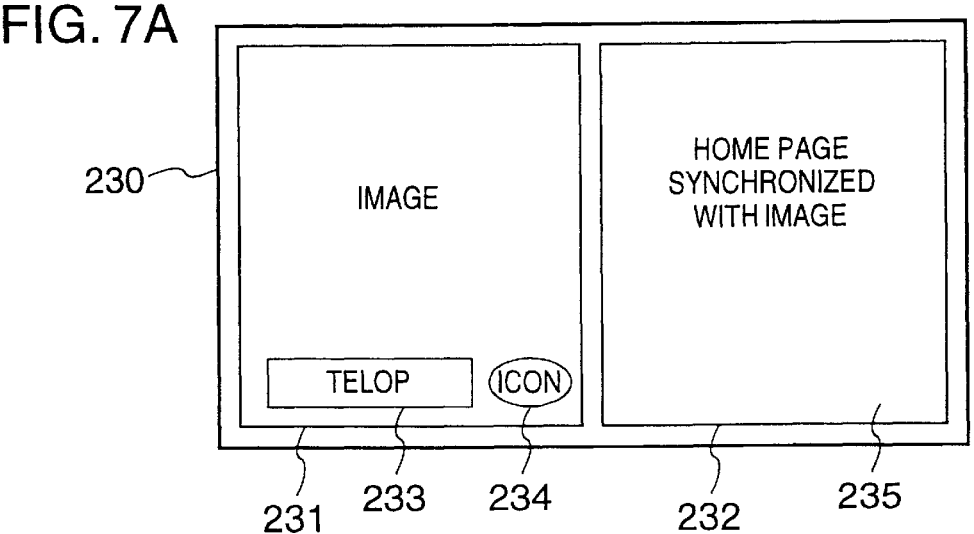
FIGS. 7A, 7B and 7C are explanatory diagrams showing different display pictures of an image and data display method and apparatus according to an embodiment of the present invention.
Figure 7B:
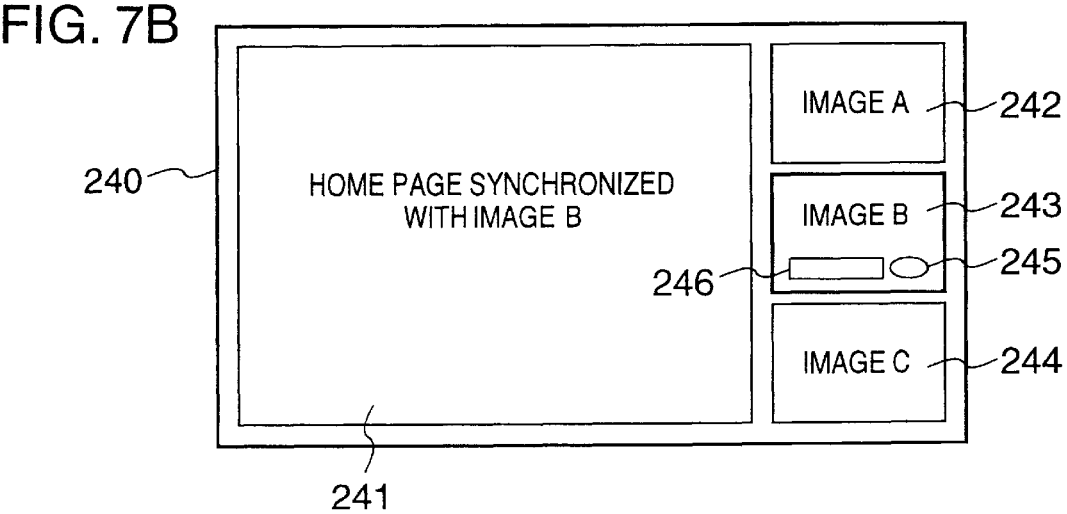
Figure 7C:
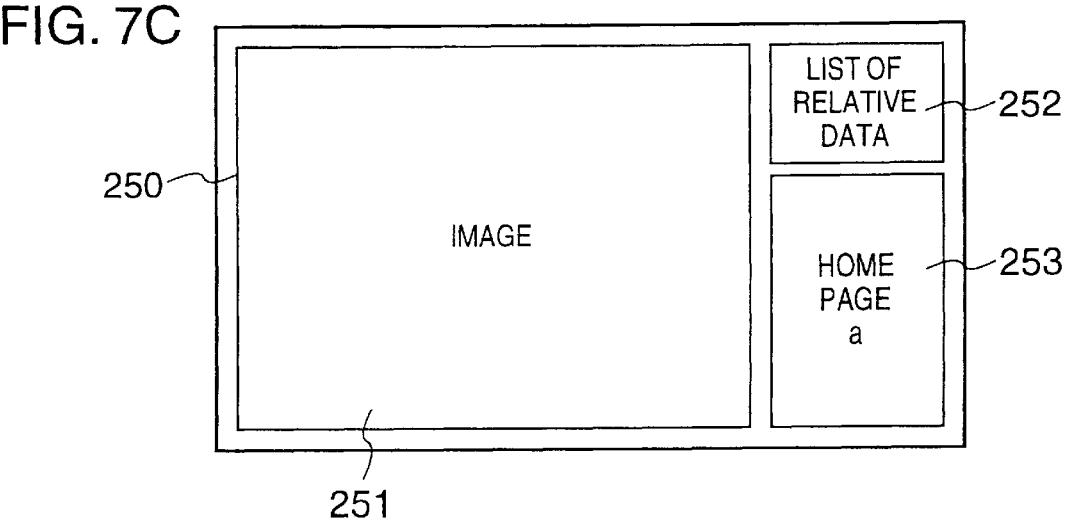
Figure 8:
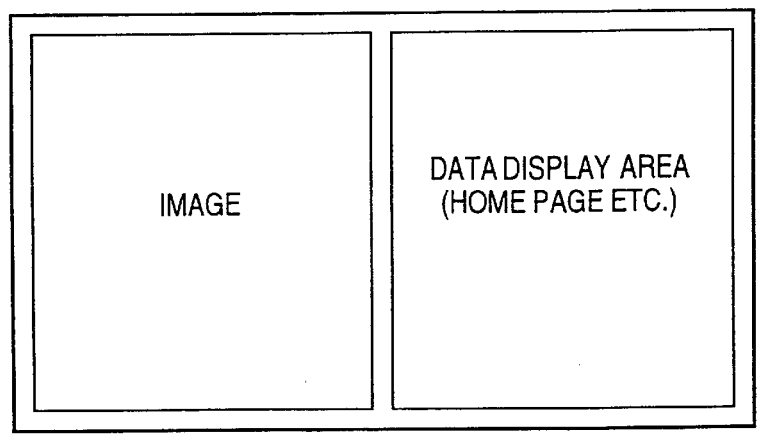
FIG. 8 is an explanatory diagram showing a display picture in a prior art image and data display method and apparatus.

Further, as the combined display mode of the image and the data, there are some other picture examples as shown in FIGS. 7A, 7B and 7C. For example, in FIG. 7A, a display screen 230 is divided into two areas. One of the areas is defined as an image display area 231 and the other is defined as a home page display area 232. In the image display area 231, existence of a relative home page is notified by an icon 234 and a telop 233. At this time, when the user instructs to change over the image, a home page 235 synchronized with the image is displayed in the home page display area 232.

In FIG. 7B, a display screen 240 is divided into one home page display area 241 and three image display areas 242, 243 and 244. The user selects an image from the image display areas and when data relative to the image exists, the existence is indicated by an icon 245 and a telop 246. A home page synchronized with an image B can be displayed in response to an input command for changing over the display.

FIG. 7C shows a display example in which it is assumed that there are a plurality of data relative to a specific image scene. An image 251 is displayed now and a list 252 of relative data such as titles of relative data is displayed. When the user selects relative data from the list, a pertinent home page 253 is displayed. As another display method in the case where there are a plurality of data relative to a specific image scene, there is a display method in which in the display picture 201 or 203 of FIG. 4 the display time of the icon and telop is time-divided among the relative data or all of icons and telops of the relative data are arranged on the picture.

Further, in FIGS. 4 to 7A, 7B and 7C, it is premised that the existence of relative data is indicated to the user and the user selects data to be displayed. When the image and the relative data can be viewed on the same picture like the display picture 209 of FIG. 4 and the display pictures of FIGS. 7A, 7B and 7C, there is a utilization form that display of the relative data is also changed automatically when a time stamp of the image is changed.

Figure 9:
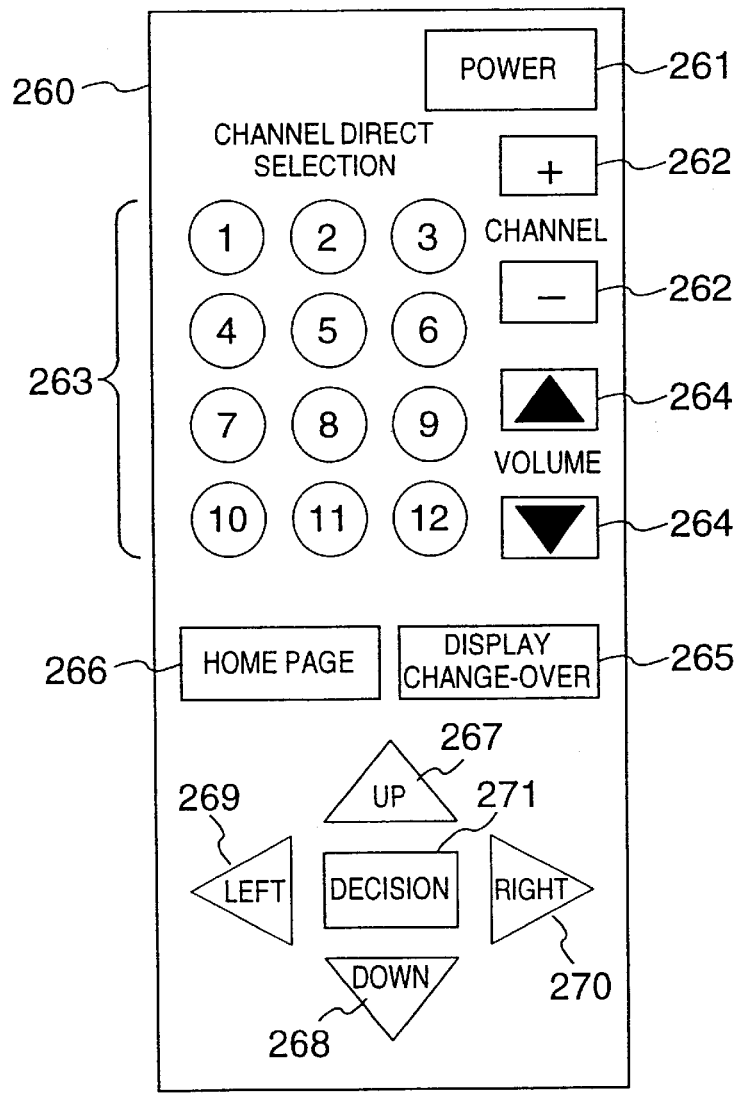
FIG. 9 is a schematic diagram illustrating an external appearance of a remote controller of an image and data display method and apparatus according to an embodiment of the present invention.

FIG. 9 shows a remote controller 260 of an example of the user input means in the present invention. The remote controller 260 includes a power button 261, a channel change-over button 262, a volume change button 264, a channel direct selection button group 263 and the like in the same manner as a usual television remote controller. The present invention is characterized in that the remote controller 260 includes a display change-over button 265 and a home page display button 266. The display change-over button controls the transition of states by the change-over of display in the display pictures of FIG. 4. That is, when the user pushes the display change-over button, the display picture moves among the display pictures of FIG. 4. Further, in FIG. 4, the transition from the display picture 209 to the display picture 213 and the transition from the display picture 201 or 203 to the display picture 218 are performed by the home page display button 266.

Further, in this embodiment, since processing for designating a link destination in the home page is required, cross keys 267, 268, 269 and 270 for moving a cursor up and down and right and left and a decision button 271 are provided. In the embodiment, the cross keys are used not only to designate a link destination in the home page but also to select relative data desired to be viewed by the user among a plurality of data relative to a specific image scene, for example, when the relative data are displayed as a list as shown in FIG. 7C. The cursor may be moved by different means other than the cross keys. Further, selection may be made without using the cursor.

Figure 10:
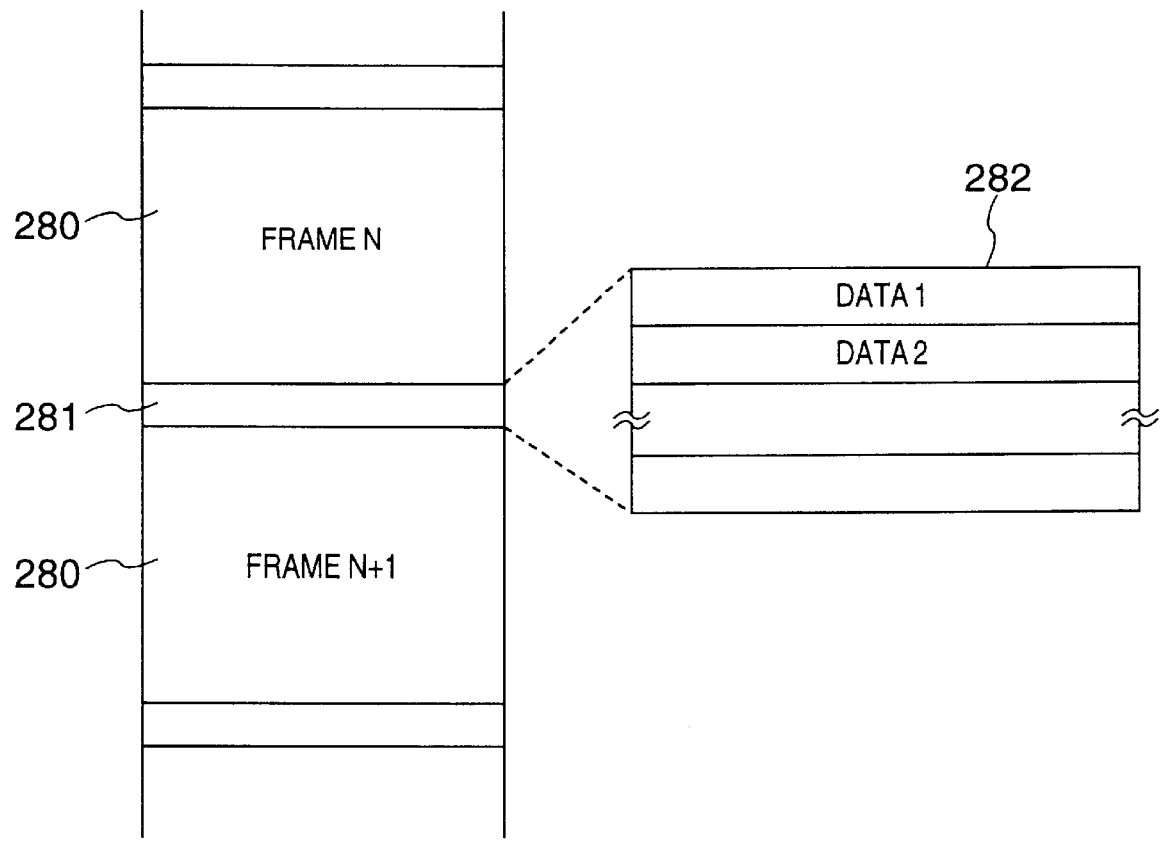
FIG. 10 is an explanatory diagram showing conceptually a construction of transmitting images and data simultaneously.

FIG. 10 shows arrangement of simultaneous transmission of image and data in terrestrial wave. Images are usually sent for each image frame 280 in surface wave, while an area 281 named a VBI (Vertical Blanking Interval) for taking synchronization in the vertical direction is provided between frames. Recently, it is permitted that empty portion of this area can be used for the data broadcasting. Data 282 are embedded in the area 281 in the broadcasting station and the data are taken out in the user terminal.

Figure 11:
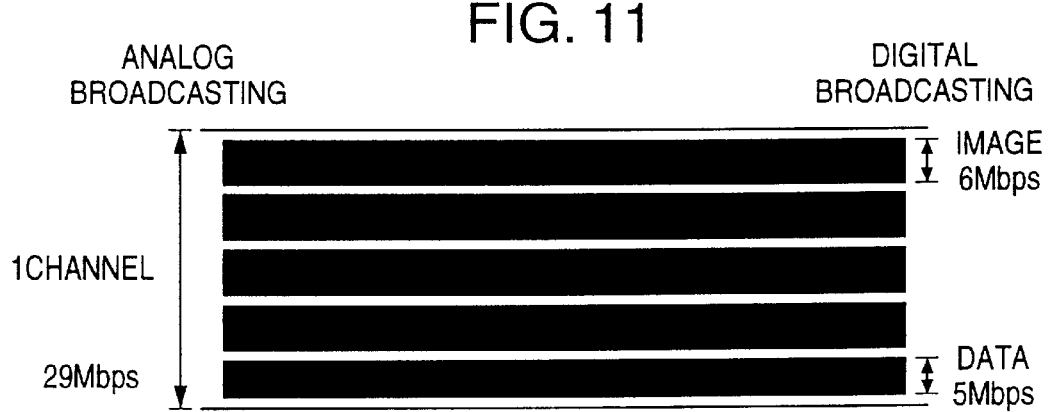
FIG. 11 is an explanatory diagram showing conceptually another construction of transmitting images and data simultaneously.

FIG. 11 shows arrangement of data broadcasting in the digital satellite broadcasting.

In the common analog satellite broadcasting, one transponder of a satellite is used to transmit one channel. However, in the digital satellite broadcasting, the image compression technique and the data multiplexing technique can be used to transmit images for four programs per transponder. At the same time, since some empty areas can be produced, this areas can be used to transmit data to the user terminal. At present, these areas are used to transmit a program guide or the like.

FIG. 12 illustrates a data model of relative data in the present invention. Data 291 holds a utilization condition 291 which prescribes users who can refer to the data. At the same time, the data has a time stamp 293 to be able to specify a related image scene 292. Further, the data holds an icon 294 and a telop 295 displayed to be superposed on an image in order to notify the existence of relative data to the user. At the same time, the data holds data contents 296 or an access method to data entity.

The above data structure is materialized as shown in FIG. 13. That is, data is managed by an identifier (id) number and includes: an image identifier (id); a utilization condition; a starting time; an end time and a duration of a time stamp; an image expressive of an icon; a character string displayed as a telop; and data contents. The image identifier (id) represents an identifier of a program image and uses a G code, for example. Further, an image scene related to data can be specified by the image identifier (id) and the starting time and the end time of the time stamp. As the utilization condition, an attribute value is set for each of previously determined attributes.

For example, the priority for selecting one of a plurality of relative data corresponding to one image is also included as one of the attributes. Alternatively, when the data is individualized, an identifier of the user is stored in this area. With regard to data contents, there is a possibility that the data is present in a home page on the Internet or a CD-ROM. In this case, an access method to the data is stored in the area.

A processing flow chart for implementing the image and display method of the present invention is now described with reference to a PAD diagrams shown in FIGS. 14 to 18. Programs corresponding to processing shown in FIGS. 14 to 18 can be stored in a memory medium such as a floppy disk and be read in a memory upon start of the programs to be executed. The memory medium may store the programs and is not limited to a floppy disk.

Figure 14:
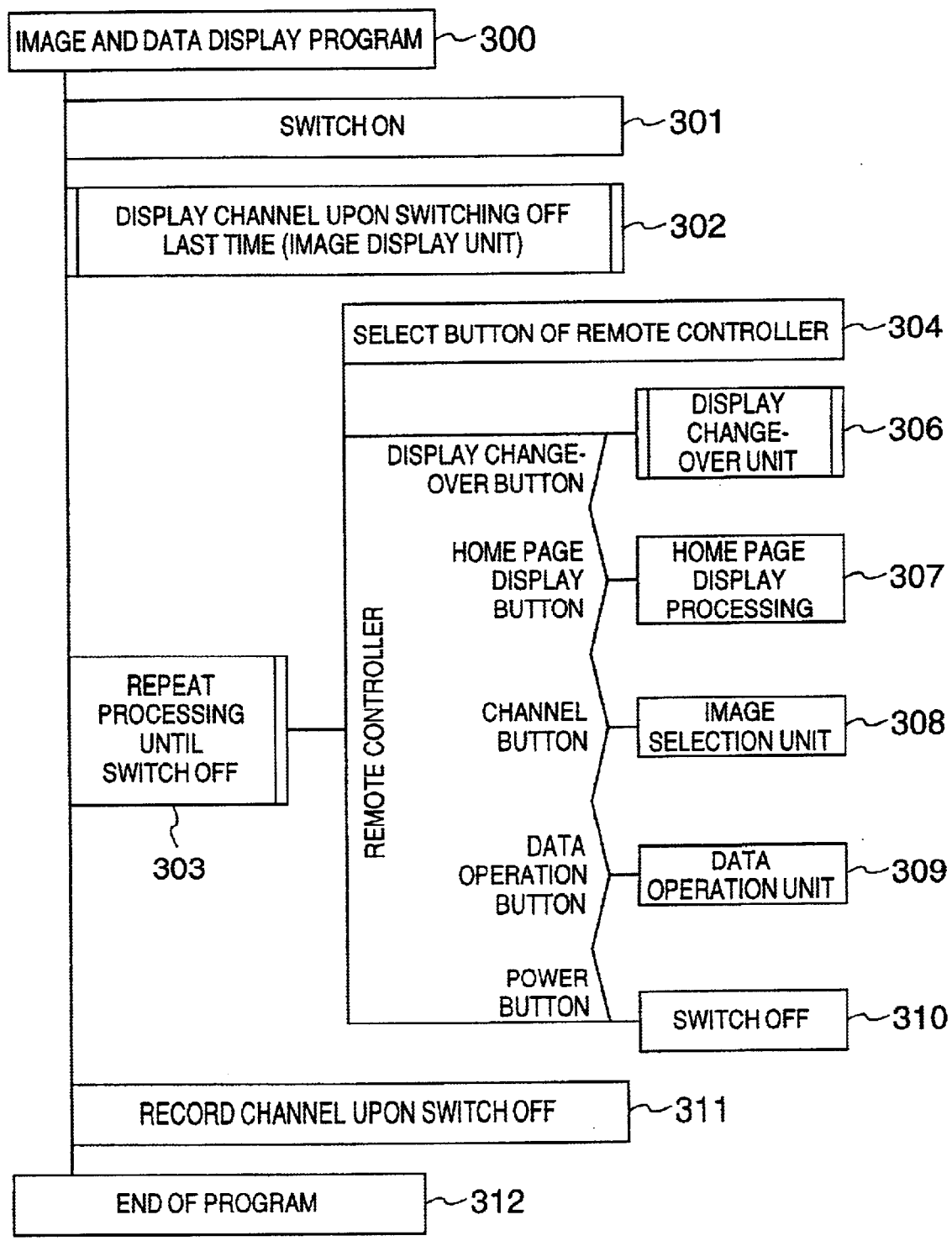
FIG. 14 is an explanatory diagram showing an overall processing of an image and data display method and apparatus according to an embodiment of the present invention.

FIG. 14 shows a processing flow of a main program 300 in the image and data display method. First, in step 301, it is detected that the user pushes the power button 261 of the remote controller 260 to turn on a switch. In step 302, a channel used when the switch was turned off last time is displayed. This processing in step 302 corresponds to processing in the image display unit and is described later. In step 303, processing in steps 304 and 305 is repeated until the switch is turned off. In step 304, a button of the remote controller 260 operated by the user is detected. In step 305, processing corresponding to each button is performed. When the display change-over button 265 is selected, processing 306 in the display change-over unit is performed.

Next, when the home page display button 266 is selected, home page display processing 307 is performed. In the home page display processing, the mode is moved to the data display mode when the existence of relative data in the image display mode is indicated by an icon and a telop in FIG. 4 and data synchronized with the image is displayed. Similarly, in the combined display mode, when a telop and an icon are displayed in the reduced image picture and the existence of relative data is indicated to the user, the display is changed over to a home page synchronized with the image in the combined display mode. Next, when the channel button 262 or the channel direct selection button group 263 is selected, processing 308 in the image selection unit 13 is performed. The present invention is characterized in that data relative to the image is also changed over differently from change-over of the channel of the usual television.

A data operation button means the cross key having the buttons 267 to 271. When the data operation button is selected, processing 309 in the data operation unit is performed. For example, the processing includes processing that a link destination on the home page is designated. Next, when the power button 261 is selected, the program 300 detects switching off and escapes from a loop 303. In step 311, a channel upon switching off is recorded so as to be able to display a television program immediately upon switching on next time.

In step 312, the program is terminated. Operation such as, for example, adjustment of volume is considered else, while such operation departs from the gist of the present invention, it is omitted.

Figure 15:
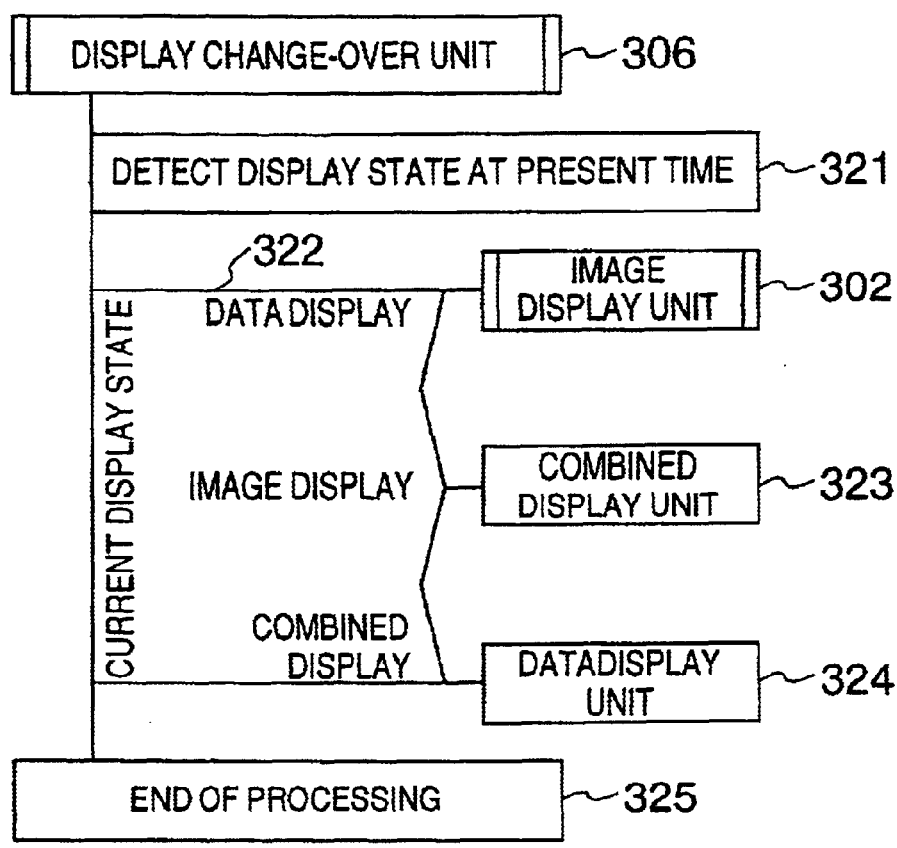
FIG. 15 is an explanatory diagram showing a flow of processing of a display change-over unit.

FIG. 15 shows a processing flow 306 in the display change-over unit 29. First, in step 321, a display mode at the present time is detected. In the embodiment, as shown in FIG. 4, there are three kinds of display modes including: the image display mode; the combined display mode of image and data; and the data display mode. In step 322, when the current display mode is the data display mode, processing 302 in the image display unit 26 is performed and the mode is moved to the image display mode. When the current mode is the image display mode, processing 323 in the combined display unit 27 is performed and the mode is moved to the combined display mode. When the current mode is the combined display mode, processing 324 in the data display unit 28 is performed and the mode is moved to the data display mode. Finally, in step 325, the processing 306 is terminated.

The processing 324 of the data display unit in the embodiment is processing for displaying a home page. In the processing 323 of the combined display unit 27, display of a home page relative to an image scene is prepared on a rear side of the image upon change-over of the picture. In this case, when there is no relative data, display of a finally viewed home page or default home page is prepared. After the completion of preparation, the image display area is reduced successively and at the same time the data display area is viewed to the user successively. The reason why animation or the like is used such that the image display area is reduced successively is that it is prevented that the user feels that it is difficult to understood since display of image and data is divided in a moment.

Figure 16:
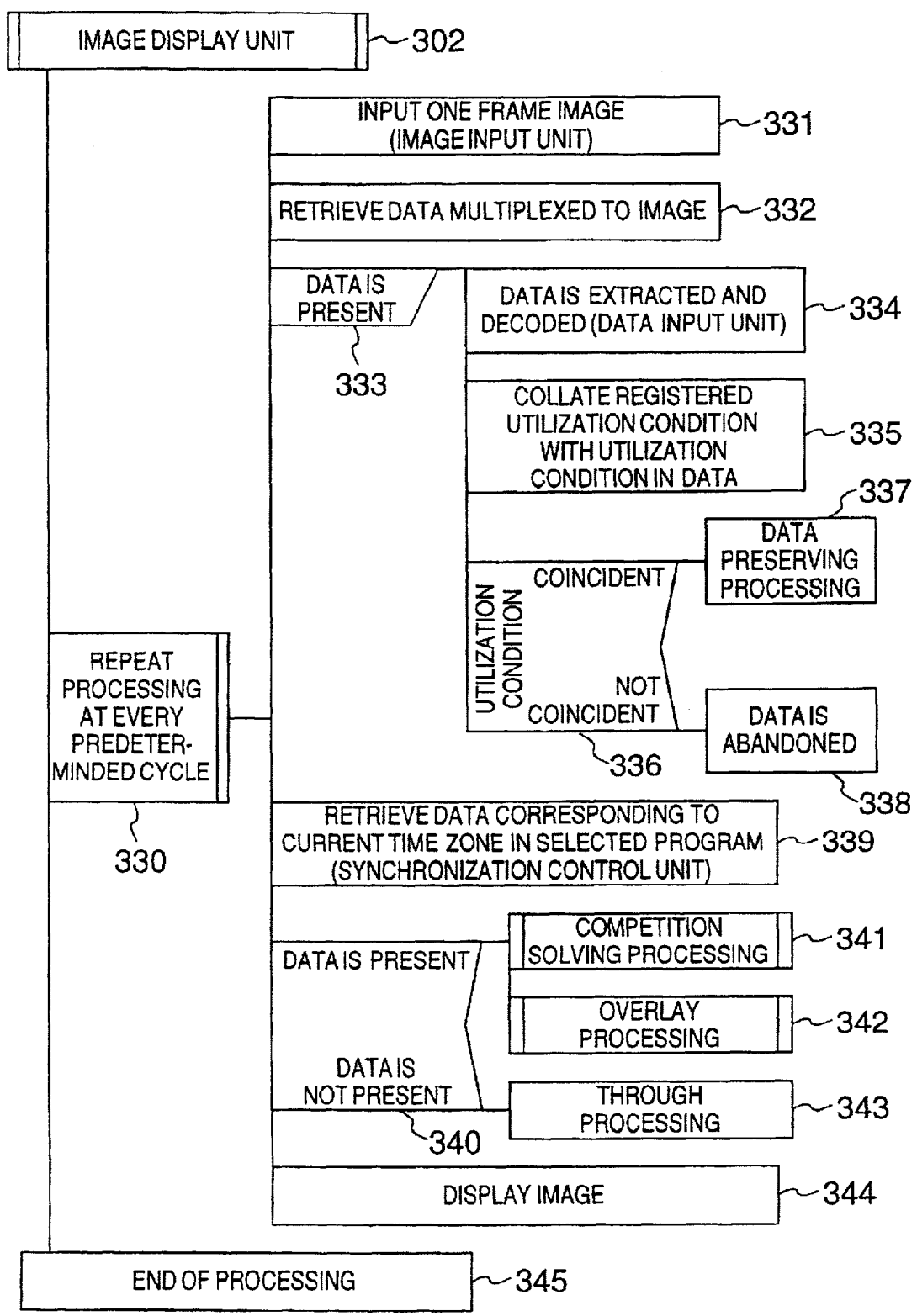
FIG. 16 is an explanatory diagram showing a flow of processing of an image display unit.

FIG. 16 shows a processing flow 302 in the image display unit 26. The method of FIG. 10 is considered as the arrangement of the simultaneous transmission of image and data. Since data is stored for each frame of the image, it is necessary to take out the data for the frame unit. Steps 331 to 344 are repeated every predetermined period (in the embodiment, every one frame unit) in step 330.

First, in step 331, one frame image is input in the image input unit. In next step 332, data embedded between frames is extracted. Since it is considered that data is not embedded, whether data is present or not is determined in step 333 and when data is present, steps 334 to 338 are performed. Processing in step 334 corresponds to processing of the data input unit 15 and in step 334 data is extracted to be decoded. Processing in step 335 corresponds to processing in the data selection unit 16 and in step 335 the registered utilization condition is collated with the utilization condition in the data. In next step 336, when both the utilization conditions are coincident with each other, the data is stored in the temporary memory area 19 in step 337. When both the utilization conditions are not coincident, the data is not stored in step 338. In step 335, the display condition of data such as a size of the icon and a font size of the character string is prescribed on the basis of the condition of utilization environment such as a size of picture screen. Since an amount of data received in one frame unit is not so much, operation that data is divided to be sent is considered. In this case, it is necessary to combine data divided for each segment to unify the data after the data preserving processing 337.

Processing in next step 339 corresponds to processing in the synchronization control unit 21 and in step 339, data corresponding to the current time zone in the currently displayed television program is retrieved. When the data structure of FIG. 13 is examined, the identifier (id) of the image and the time stamp are also previously prescribed and accordingly the identifier of the image and the time are compared with the identifier of the currently displayed image and the current time. In step 340, when coincident data are present, steps 341 to 342 are performed and when coincident data are not present, step 343 is performed. In step 341, since there is a possibility that a plurality of data are selected at the same time, processing for solving such conflict is required. After solving the conflict, in step 342 the icon and the telop are overlay-displayed on the image. Each processing is described in detail later.

Thereafter, the displayed icon and telop or the icon and telop which have low display priority and cannot be displayed are recorded. These icons and telops are converted into a home page in response to a request from the user and are prepared to be always accessed. In step 343, since there is not pertinent data, the image is outputted to the display unit. In step 344, the combined image of icon and telop or the image is displayed for one frame unit. Processing in steps 339 to 343 may be repeated every predetermined period. The processing in steps 339 to 343 is not necessarily required to be performed for each frame, while in the embodiment the processing is embedded in the loop 330 of one frame unit. When the mode is changed to the data display mode or when the switch is turned off, the processing is terminated in step 345.

Figure 17:
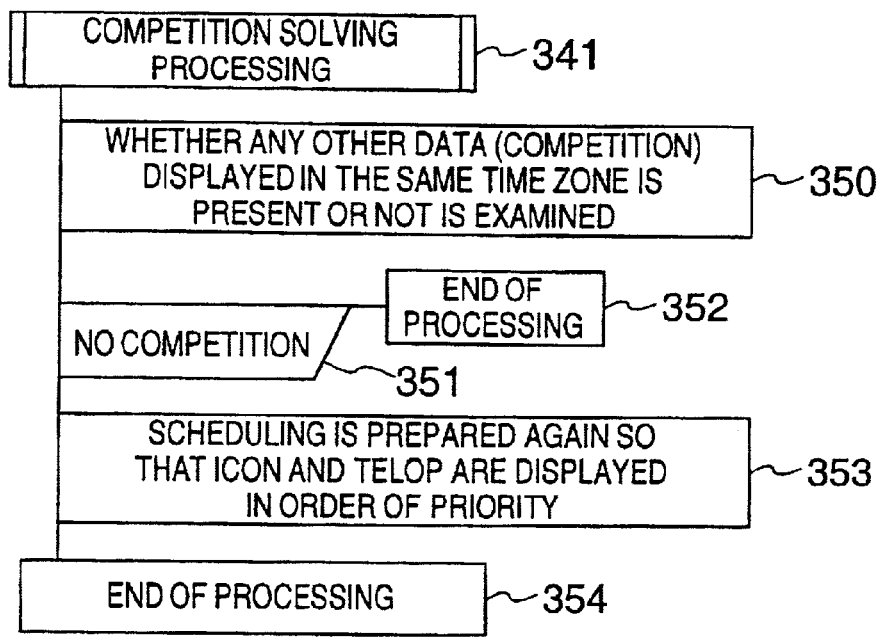
FIG. 17 is an explanatory diagram showing a flow of competition solving processing.

FIG. 17 shows a processing flow for conflict solving processing 341. In step 350, whether any other data relative to the same time zone is present or not is examined. In this embodiment, the case where a plurality of data is assigned in the same time zone is named the competition. As shown in FIG. 7C, when a list of relative data can be displayed in the form of list, the list of relative data may be displayed as it is, while when an icon and a telop indicative of contents of each individual relative data are displayed, it is necessary to decide an order of display, a display time and the like. Thus, whether there is a conflict or not is detected in step 351 and when there is no competition, the processing is terminated as it is (step 352). When there is a conflict, the display priority of data is determined and scheduling is prepared again so that the .icon and the telop are displayed in order of the priority. Finally, the processing 341 is terminated in step 354.

Figure 18:
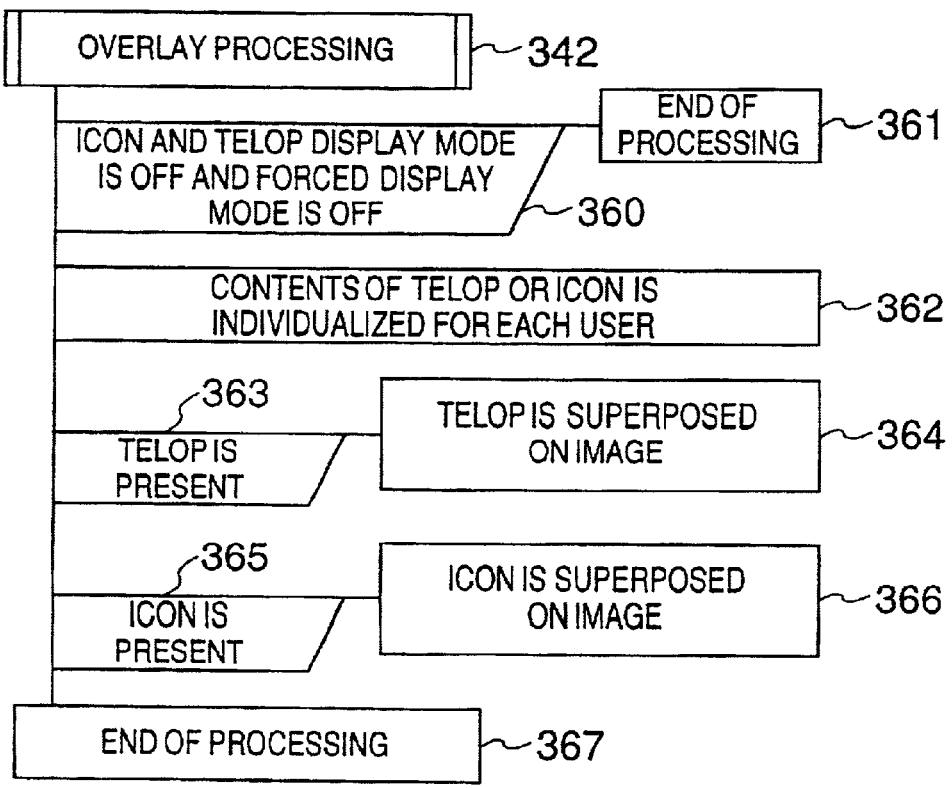
FIG. 18 is an explanatory diagram showing a flow of overlay processing.

FIG. 18 shows a processing flow of overlay display processing 342. In step 360, a display mode of icon and telop by the user and a forced display mode of icon and telop by the information provider are detected. When the forced display mode is on even if the display mode of icon and telop is off, data and a telop are forcedly displayed on the image to be overlapped on each other. Accordingly, in order not to perform the overlay processing, it is necessary to turn off the display mode of icon and telop and also turn off the forced display mode by the information provider. In step 362, the icon and the telop are individualized for each user on the basis of the previously determined display condition. In next steps 363 and 364, when the telop is present, processing 364 for superposing the telop on the image is performed. Similarly, in step 365, when the icon is present, processing 366 for superposing the icon on the image is performed. The processing method of superposing a character string and a picture on the image conforms to the processing for superposing data on usual image to be displayed.

The embodiment of the present invention has been described laying stress on the broadcasting media, while the present invention can be used as the image and data display method using package media and communication media.

Next, a second embodiment in which the present invention is implemented in the utilization form in which contents on a network are provided together with information of goods such as advertisement or the like is described. More particularly, the present invention is applied to a method of providing information of goods in the WWW on the internet.

Figure 19:
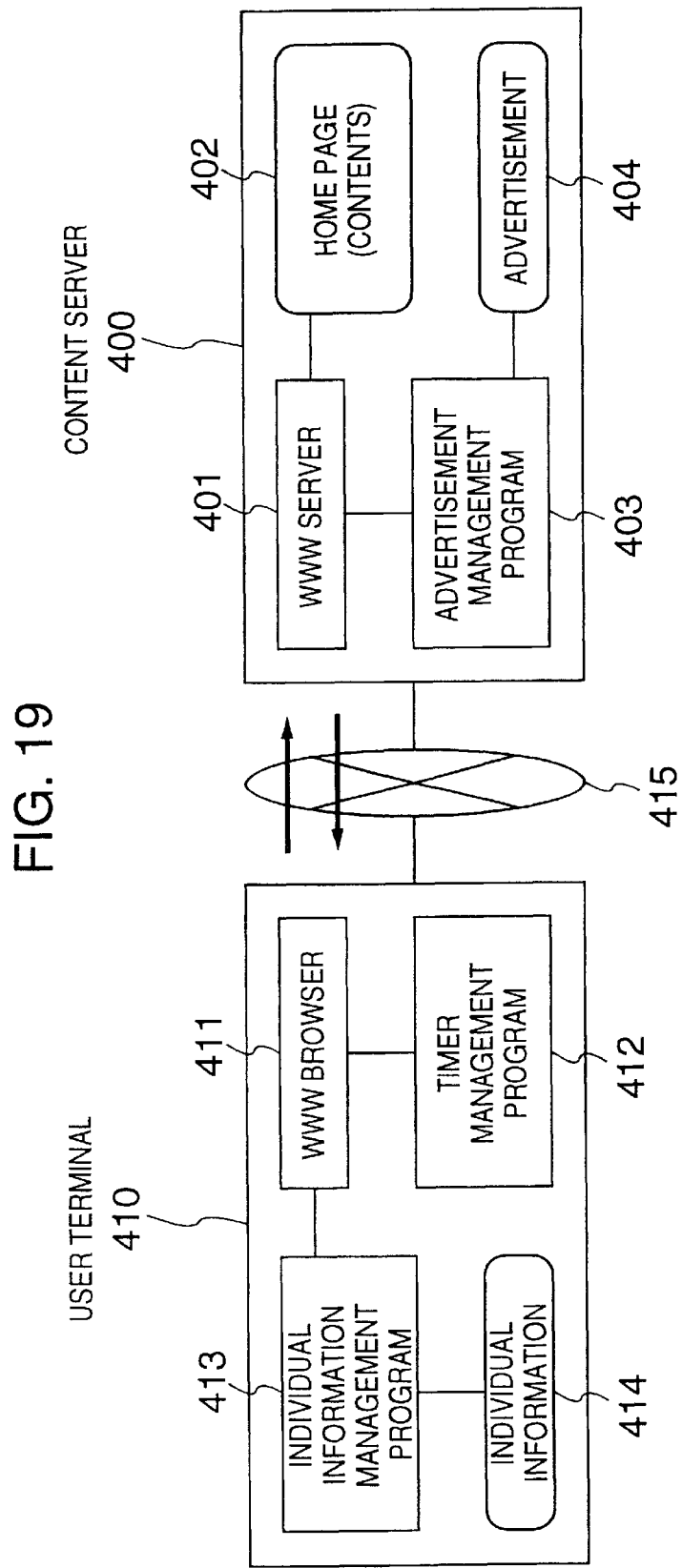
FIG. 19 is a schematic diagram illustrating an overall system in case where the present invention is applied to a method of providing advertisement in WWW on the Internet.

FIG. 19 is a schematic diagram illustrating an overall system of the embodiment. The system includes a contents server 400 and a user terminal 410 both of which are connected to the internet 415.

The contents server 400 includes a WWW server 401 and an advertisement management program 403, which are interlocked with each other by means of a CGI (Common Gateway Interface) conforming to the standard of WWW.

The WWW server 401 provides a home page 402 in response to a request from the user terminal 410. As described above, in the embodiment, the home page constitutes contents.

The advertisement management program 403 manages advertisement and provides information 404 of goods suitable for the user. More particularly, an area (hereinafter referred to as an advertisement area) in which the advertisement can be displayed is previously ensured in the home page 402 and suitable advertisement is embedded in the area. Further, as described later, since user's individual information is sent from the user terminal 410, suitable advertisement is selected on the basis of the user's individual information. At this time, when a plurality of information items of goods are selected, the display priority of each advertisement is prescribed and the advertisement is displayed in accordance with the priority.

The user terminal 410 includes a WWW browser 411, a timer management program 412, and an individual information management program 413. The timer management program 412 and the information management program 413 prescribe inter-program interfaces with respect to the WWW browser 411 and are interlocked with the browser. Alternatively, it is considered that the WWW browser 411 includes the timer management program 412 and the information management program 413, while the embodiment deals with the above structure.

The WWW browser 411 requires the home page from the WWW server 401 and receives the home page sent from the WWW server to be displayed.

The timer management program 412 manages the duration of display of each home page and sends a display request command of next information (in the embodiment, particularly, information of goods) to the WWW browser 411 every predetermined time. When the WWW browser 411 can cope with the request by the fact that information pertinent to the request is stored in a cache or a buffer, the WWW browser 411 copes to that extent and when it is necessary to make inquire to the server side, the WWW browser sends a command to the server.

The individual information management program 411 manages the user's individual information 413 and sends the individual information to the WWW server 401 through the WWW browser 411 if necessary. Since the WWW server 401 selects information of goods on the basis of the individual information, the individualized or classified information of goods is sent to the user.

The individual information is information concerning characters such as age, sex, address and the like and taste such as hobby, the likes of the user. There is considered implementation including: for example, (1) when the WWW browser makes inquiry to the WWW server, a network address of the user terminal is informed to the WWW server and accordingly this address is used as the individual information; (2) a file or program for taking custody of and managing the individual information is prepared separately; and (3) the individual information is managed by a third party agency collectively and the WWW server makes inquiry to the agency on the basis of the user's identifier. Particularly, in the above items (2) and (3), in many cases, the user previously decides the individual information which has no problem if it is opened to the public in view of protection of privacy. In this embodiment, implementation (2) is herein described.

The utilization image or outline of the embodiment is now described.

Figure 20:
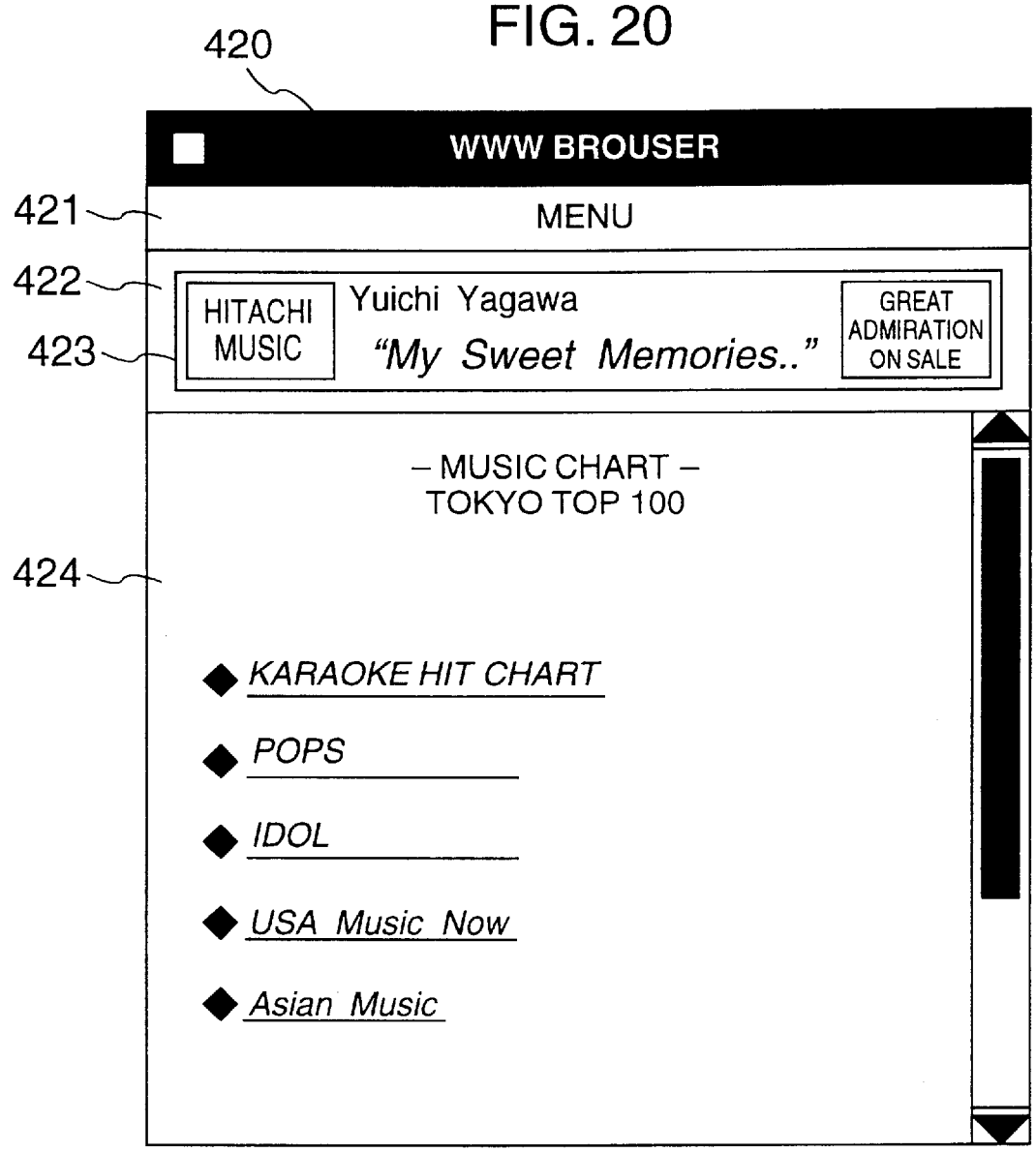
FIG. 20 illustrates a display picture of a WWW browser in a user terminal.

FIG. 20 shows a picture configuration of the WWW browser 411 in the user terminal 410. The WWW browser 411 includes a window 420 having a menu 421. The window includes an advertisement area 422 for displaying an advertisement (information of goods) 423 and a home page display area for displaying contents required by the user. Definitely, there is considered implementation such as (1) the window is divided into an area in which a home page by one HTML file is displayed and an area in which an advertisement is displayed, and (2) the advertisement 423 is also set as one home page and a frame tag of the HTML is used to display a plurality of home pages in one window.

Further, in the case of (2), a parent home page for deciding an arrangement of the home page in the window is required, while it is assumed that the home page including the contents has the function of the parent home page and the home page for the advertisement is included in the home page for contents.

Generally, the advertisement 423 is often called a burner advertisement, while the present invention is characterized in that a plurality of advertisements can be displayed with respect to one home page and even if the home pages are identical, the advertisement is individualized or classified for each user. In other words, in FIG. 20, even if contents displayed in the home page display area 424 are identical, there is a possibility that contents displayed in the advertisement area 422 are different for each user. Further, a plurality of advertisements are assigned to the home page 424 and the advertisement 423 in the advertisement area 422 is changed to another advertisement every predetermined time. Methods of displaying a plurality of advertisements, is implemented as (1) the duration for displaying one advertisement is provided as described above and advertisement is changed every time period, and (2) when the advertisement area 422 is sufficient, the advertisements are displayed as a list. In this embodiment, implementation (1) is discussed below.

Figure 21:
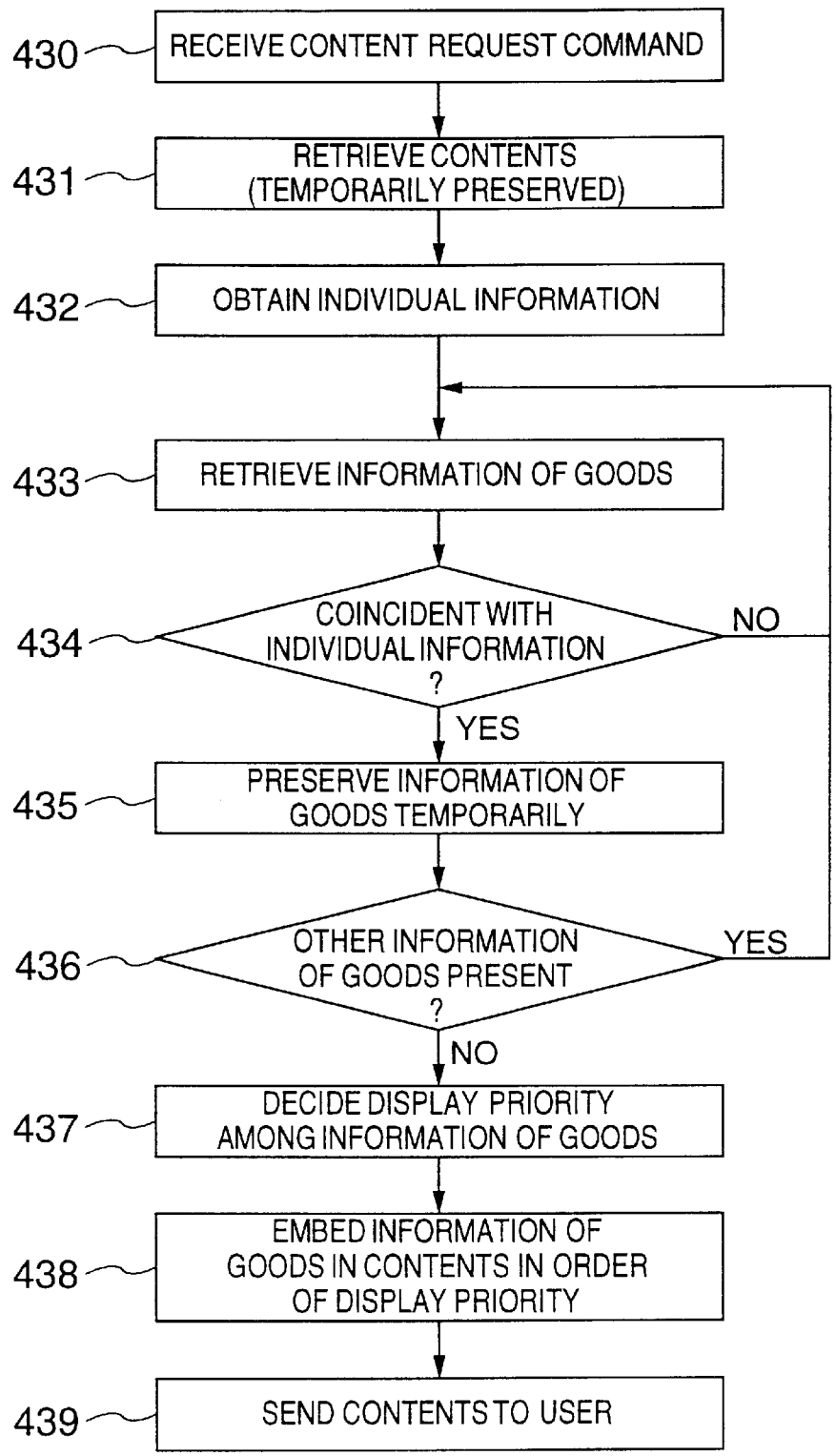
FIG. 21 is a flow chart showing processing in a contents server.

The flow (FIG. 21) of processing in the contents server is now described.

First, the WWW server 401 receives a content request command from the WWW browser 411 (step 430). Then, the command is analyzed to retrieve pertinent contents (step 430). As described above, in this embodiment, the home page constitutes the contents. Further, since the advertisement area has been previously provided in the home page and advertisement is embedded in the advertisement area by later processing, the retrieved contents are preserved temporarily.

Then, in step 432, the WWW server 401 obtains individual information from the WWW browser 411. Individual information is sent from the WWW browser together with the content request command, while generally the WWW server receives a content request command and request the individual information to the WWW browser.

FIG. 23 shows a data structure of the individual information. The individual information includes attribute values 462 for each user defined for previously prescribed attributes 460. The individual information is managed as arrangement including a combination of attributes 460 and attribute values. The attributes 460 include characters such as age, sex and address and taste such as hobby, favorite music genre, favorite movie genre and kinds of favorite books of the user. The attributes are not required to be unified for each service and can be prescribed on the side of the user or the service provider newly. Further, since conventional or fixed information may be selected as the characters in inputting of the attribute values, a structure such as a pull-down menu which is easy to select the attribute values is adopted. In addition, a simple structure is adopted so that taste can be input by presenting questions to the user and accepting responses.

Next, the information-of-goods management program 403 retrieves information of goods coincident to the user's individual information and preserves the coincident information of goods temporarily (steps 433 to 436).

A list of advertisements as shown in FIG. 24 is used to retrieve information on goods. In the list of advertisement, the user's attribute of a target is prescribed for each advertisement (470 to 477 of FIG. 24). Items (480 to 486 of FIG.

24) of the attributes are the same as the individual information of FIG. 23. Further, since the attribute values increase a width of the target user, a range or a plurality of attribute values are often input. For example, in advertisement 470, the attribute of age 480 is prescribed to a range from 20 to 35 years old. In FIG. 24, "Don't Care" means that the attribute value may be any value. That is, as the retrieval condition, reference is not made to the item of "Don't Care". Further, although not shown in FIG. 24, logical symbols such as "NOT", "AND" and "OR" may be used to prescribe complicated conditions for each item.

In step 433, an advertisement corresponding to the contents is first retrieved from the list of advertisements. As shown in FIG. 24, since the list of advertisements include an item 487 in which URLs of home pages can be recorded, a pertinent advertisement is retrieved on the basis of the URLS. Since an advertisement relative to contents can be displayed by causing contents to correspond to advertisements, there is a merit that the appealing power of goods to the user can be increased. It is a matter of course that it is considered that specific contents do not correspond to THE advertisement.

Next, a vector matching to the received individual information of the user is taken for each advertisement. In vector matching, each advertisement and individual information are both regarded as sets (vectors) of attribute values and the degree of matching is calculated between the two vectors. As the calculation method, there are methods as follows: (1) whether the attribute value of the individual information is coincident with the condition of the advertisement list or not is calculated for each attribute item and the calculated results are ANDed; and (2) to what extent the attribute value of the individual information is coincident with the condition of the advertisement list is calculated for each attribute item and the calculated results are combined. In the embodiment, method (1) is described below.

In step 434, when the advertisement is coincident with the individual information, the advertisement is temporarily preserved (step 435) and when the advertisement is not coincident with the individual information, operation proceeds to step 436. The display priority of the advertisement preserved temporarily in step 435 is determined later. In step 436, the processing is repeated for a next advertisement.

There are many cases where there are a plurality of advertisements coincident with the user's individual information. For example, in the case of FIGS. 23 and 24, the advertisements 470 to 477 are coincident with all of the user's individual information. As described above, since the display area of advertisement has a limitation, all of advertisements cannot be displayed at a time. Accordingly, in the present invention the display priority is prescribed and advertisements are changed successively in accordance with the priority.

In step 437, the display priorities among the temporarily preserved information for goods are determined. As definite methods, the following methods are used: (1) degrees of importance as previously determined among all advertisements and the display priorities conform to the degrees of importance, (2) when the vector matching of the user's individual information and the advertisement is taken, the degree of matching of both is calculated and the display priorities are determined in order of the degree of matching, and (3) the methods (1) and (2) are combined so that the degrees of importance degrees are weighted in accordance with the degrees of matching and the degrees of weighted importance are used as the display priorities. In this embodiment, method (1) is described below. Definitely, as shown in FIG. 24, an item 487 of the degree of importance is provided in the advertisement list and the display priorities are determined in order of advertisements having higher degree of importance. For example, in FIGS. 23 and 24, the display priorities are in order of advertisements 470, 471, 472, 473, 474, 475, 476 and 477. Further, when the degree of importance are the same, the display priorities are determined on the basis of other factors, while in the embodiment, the display priorities are determined simply in order of description in the advertisement list.

The degree of importance corresponds to the advertisement charge. Accordingly, an advertisement of goods for which increased an advertisement charge is paid is displayed preferentially.

Figure 25:
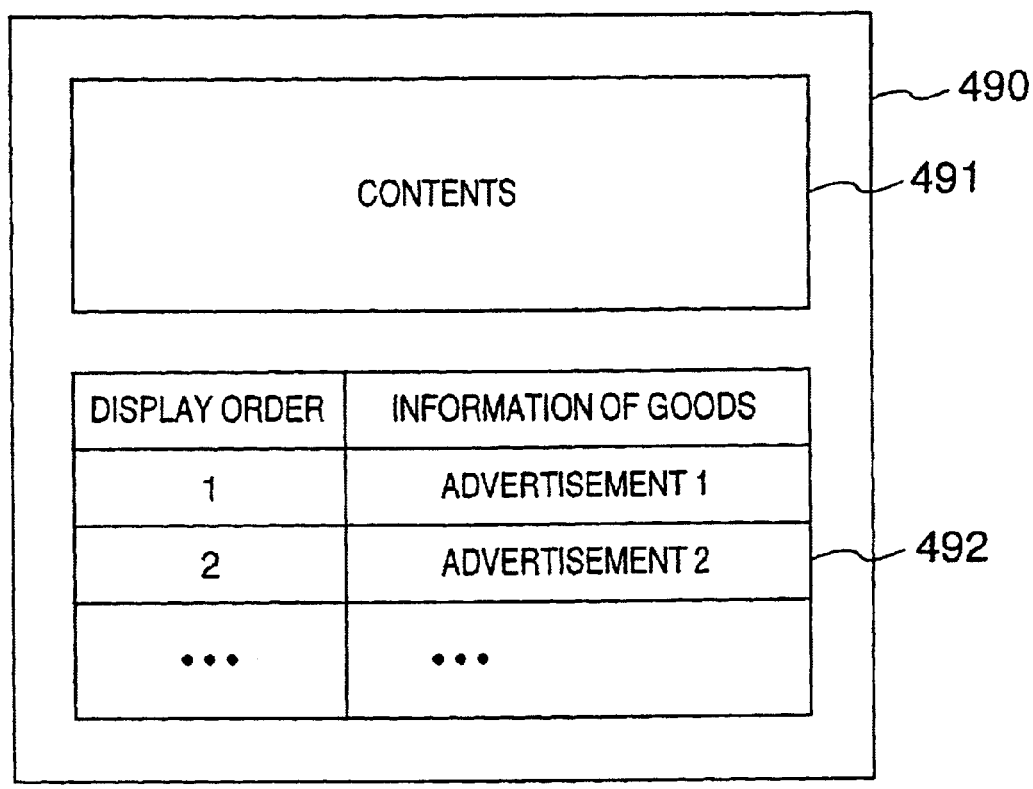
FIG. 25 is a diagram showing a conceptual structure of a home page.

In next step 438, the advertisements are embedded in the home page in order of priority. A conceptual structure of the home page in which advertisements are embedded is shown in FIG. 25. The home page 490 includes a content portion 491 and advertisements arranged in order of the display priority. The reason the structure of the home page is described conceptual is that a home page generally has only information displayed simultaneously and when display of a part of the home page such as, for example, the advertisement area is desired to be changed, an inquiry is made to the server at any time. However, improvement of the current WWW can cope with the structure shown in FIG. 25 and accordingly in the embodiment description is made as it is.

Finally, in step 439, the home page 490 is transmitted to the user terminal.

Figure 22:
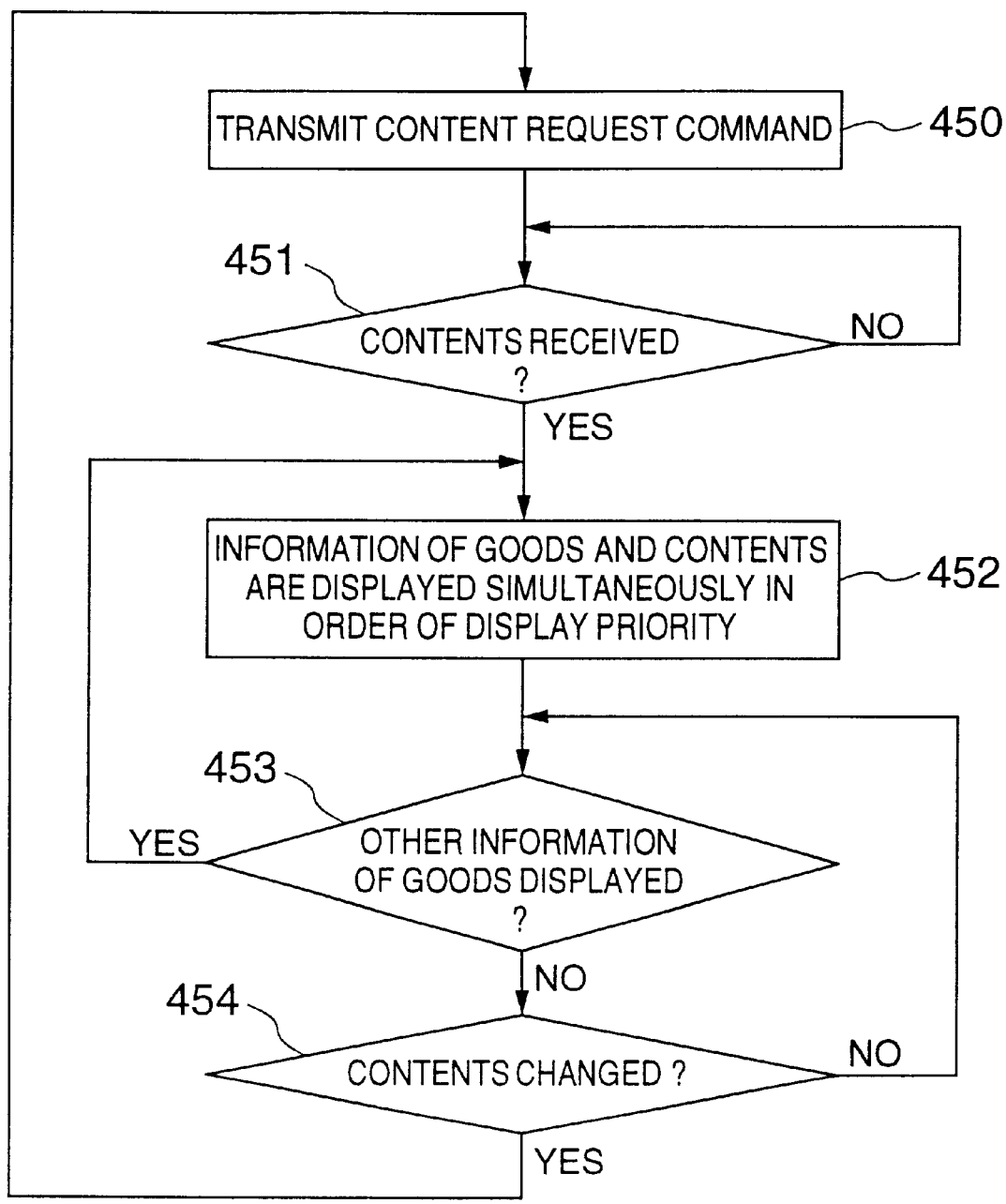
FIG. 22 is a flow chart showing processing in a user terminal.

Next, the flow (FIG. 22) of processing in the user terminal is described.

First, in step 450, the WWW browser transmits a request command of the home page to the WWW server. At the same time, the WWW browser sends the individual information to the WWW server in cooperation with the individual information management program. The contents server receives the information and performs the processing shown in FIG. 21. Accordingly, the WWW browser waits until the home page is completely received (step 451).

In next step 452, the home page is displayed. At this time, the advertisement is also displayed in accordance with the display priority besides the contents. The display picture in this case is as shown in FIG. 20, for example.

The processing in steps 453 and 454 are repeated at predetermined times. In step 453, whether another advertisement is displayed or not is examined. Since the duration of display of each advertisement is previously prescribed, the timer management program examines the duration. When it is time to change the advertisement, operation is returned to step 452 in which only the advertisement is changed to an advertisement having a next display priority. Otherwise, operation is moved to step 454.

When it is assumed that the duration also corresponds to the advertisement charge, the advertisement of goods to which the increased advertisement charge is paid can be displayed for a long time.

In step 454, whether a request for changing contents is issued from the user is determined. When there is a request for changing contents, operation is returned to step 450 and the operation starting from the transmission of the content request command is repeated. Otherwise, operation returns to step 453.

The method of providing the information of goods in the WWW on the Internet has been described, while the present invention is not limited to the Internet and the WWW and can be used in other communication media such as, for example, the communication using the personal computer.

According to the above embodiments, the existence of data classified or individualized for each user in relation to the displayed image scene can be presented to the user by the picture or character string indicative of contents of the relative data. At the same time, the relative data can be displayed synchronized with the image in response to a request of the user. In this manner, the possibility of accessing from the image to the relative data simply brings the information provider a benefit that the viewers are drawn in by a broadcasting image to move to the bidirectional media such as the Internet immediately. At the same time, the viewer can know detailed information relative to the image more simply. Further, since information suitable for the individual user can be sent directly, information can be provided and referred effectively.

Further, according to the embodiments, since the display condition and the display order of the picture and the character string indicative of the existence of the relative data are determined on the basis of the utilization environment condition, the existence of the relative data can notified to the user clearly and understandably.

Furthermore, in the embodiments, since there is provided the mode for displaying the image and the data simultaneously, access can be made to the image and the data freely to refer to information.

In addition, when the user inputs a command for displaying a list, a list of pictures and character strings displayed until now is displayed. When the user selects any one in the list, the relative data is displayed. Accordingly, the user can first view only the images continuously and refer to the relative data slowly later.

Moreover, in the embodiments, the number of relative data to be displayed as a list is limited and when the number of data exceeds the limitation, the data is selected in accordance with the priority. Accordingly, the memory area can be maintained to be small and consequently the cost of the terminal can be reduced.

Further, in the embodiments, since there is provided the mode for forcedly displaying the picture and the character string indicative of contents of the relative data, the intention of the information provider can be transmitted to the user of the target exactly.

What is claimed is:

1. A method of displaying video information on a display device included in a receiver broadcast from an information broadcasting apparatus, comprising:
   (a) receiving the video information having a plurality of sequential a scene of the plurality of sequential images in the video information, and a plurality of first utilization conditions indicative of a characteristic of a user corresponding to a plurality of related data, respectively from the information broadcasting apparatus;
   (b) comparing a second utilization condition indicative of characteristics of the user registered with the receiver and the plurality of first utilization conditions, respectively;
   (c) selecting the related data corresponding to the first utilization condition further corresponding to the second utilization condition from the plurality of related data in accordance with the compared result obtained from the step (b);
   (d) determining at least one related data among the selected related data in accordance with information indicative of a display priority order added to the selected related data when there is a plurality of the selected related data that conflict with other related data of the plurality of the selected related data; and
   (e) displaying, on the display device, information corresponding to the at least one related data determined by the step (d),
   wherein the display priority order is determined by a value of providing the related data.

2. A method according to claim 1, wherein the second utilization conditions comprises at least one of an age, a sex, an address, a hobby and a character, of a user.

3. A method according to claim 1, wherein the first and second utilization conditions have an identifier for identifying a user.

4. A method according to claim 1, wherein the related data is the information to be displayed on the display device.

5. A method according to claim 1, wherein the related data includes data indicative of an access manner to the information to be displayed on the display device, and the step (e) includes a step of accessing the information in accordance with the related data.

6. A method according to claim 5, wherein the data indicated by the access manner to the information includes URL on Internet.

7. A method according to claim 5, wherein the receiver is connected to a storage medium storing the information to be displayed on the display device, and the access manner for the information includes an access manner to the storage medium.

8. A method according to claim 1, wherein the step (e) of the display displays simultaneously the image indicative of the information corresponding to the selected related data and the received video information.

9. A receiver having a display device for receiving video information broadcast from an information broadcasting apparatus and for displaying the received video information on the display device, comprising:
   a receiver unit for receiving the video information having a plurality of sequential images broadcast from the information broadcasting apparatus, a plurality of related data corresponding to a scene of the plurality of sequential images in the video information, and a plurality of first utilization conditions indicative of a characteristic of a user corresponding to the plurality of related data, respectively;
   a storage unit having a second utilization condition, previously stored, indicative of the characteristic of the user registered with the receiver;
   a controller connected to said receive unit and said storage unit through signal lines, for comparing the second utilization condition with the plurality of first utilization conditions, respectively, and selecting the related data corresponding to the first utilization condition further corresponding to the second utilization condition from the plurality of data in response to a compared result; and
   a display control unit to control and display, on the display device, information corresponding to predetermined related data among the selected related data corresponding to the scene of the plurality of sequential images indicative of the received video information in accordance with information indicative of a display priority order added to the selected related data in a case where there are a plurality of the selected related data and the plurality of the selected related data conflict with one another, wherein said display control unit controls display information corresponding to the selected related information in accordance with information indicative of a display priority order added to the selected related data, the priority order being determined by a value of providing the related data.

10. A receiver according to claim 9, wherein said display control unit carriers out a control to display synchronously the image indicative of the information corresponding to the selected related data and the received video information.

11. A receive according to claim 9, wherein said display control unit controls the display device in accordance with information indicative of a display priority order added to the selected related data.

12. A receiver according to claim 9, wherein the first and second utilization conditions include at least one of an age, a sex, an address, a hobby and a character, of a user.

13. A receiver a according to claim 9, wherein the first and second utilization conditions include an identifier for identifying a user.

14. A receiver according to claim 9, wherein the related data is the information to be displayed on the display device.

15. A receiver according to claim 9, further comprising, an access control unit for connecting to the information source with the related data used when the related data includes data indicative of an access manner to the information to be displayed on the display device.

16. A receiver according to claim 15, wherein said access control unit includes a communication control unit connected with a computer through a network for accessing to the computer having information corresponding to the selected related data in accordance with data indicative of the access manner.

17. A receiver according to claim 16, wherein the data indicated by the access manner includes a URL on Internet.

18. A receiver according to claim 16, wherein said access control unit includes a storage medium control unit connected with a storage medium storing information for accessing information corresponding to the selected related data in accordance with data indicative of the access manner.

19. An information broadcasting apparatus for broadcasting video information to a plurality of receivers, comprising:

means for providing a correspondence to a scene of a plurality of sequential images in the video information and a plurality of related data related to the scene of the plurality of sequential images in the video information;

means for providing a correspondence to the plurality of related data and a plurality of first utilization conditions indicative of characteristics of users, respectively; and means for broadcasting the video information, the plurality of related data and the plurality of first utilization conditions to the plurality of receivers, wherein at least one of the plurality of receivers performs the following processing:

a processing means for comparing a second utilization condition, previously stored, indicative of the characteristic of the user registered with the receiver and the plurality of first utilization conditions, respectively;

a processing means for selecting the related data corresponding to the first utilization condition further corresponding to the second utilization condition from the plurality of data in accordance with a compared result; and a processing means for displaying, on the display device, information corresponding to predetermined related data among the selected related data corresponding to the scene of the plurality of sequential images indicative of the received video information in accordance with information indicative of a display priority order added to the selected related data in a case where there are plurality the selected related data and that conflict with other selected related data, wherein said receiver carries out the display in accordance with information indicative of a display priority order added to the selected related data, the priority order being determined by a value of providing the related data.

20. An information broadcasting apparatus according to claim 19, wherein said receiver displays, as the display processing, simultaneously an image indicative of information corresponding to the selected related data and the received video information.

21. An information broadcasting apparatus according to claim 19, wherein the first and second utilization conditions include at least one of an age, a sex, an address, a hobby and a character, of a user.

22. An information broadcasting apparatus according to claim 19, wherein the first and second utilization conditions include an identifier for identifying a user.

23. An information broadcasting apparatus according to claim 19, wherein the related data is the information to be displayed on the display device.

24. An information broadcasting apparatus according to claim 19, wherein the related data includes data indicative of an access manner to the information to be displayed on the display device.

25. An information broadcasting apparatus according to claim 23, wherein the data indicated by the access manner to the information includes a URL on Internet.

26. An information broadcasting apparatus according to claim 23, wherein the access manner to the information includes an access manner to a storage medium storing the information to be displayed on the display device.

27. A method of broadcasting video information to a plurality of receivers, comprising the steps of:

(a) providing a correspondence to the video information and a plurality of related data related to the video information;

(b) providing a correspondence to the plurality of related data and a plurality of first utilization conditions indicative of characteristics of users, respectively; and (c) broadcasting the video information, the plurality of related data and the plurality of first utilization conditions to the plurality of receivers, wherein at least one of the plurality of receivers performs the following processing:

comparing a second utilization condition, previously stored, indicative of the characteristic of the user registered with the receiver and the plurality of first utilization conditions, respectively;

selecting the related data corresponding to the first utilization condition further corresponding to the second utilization condition from the plural data in accordance with a compared result; and displaying an image indicative of information corresponding to the selected related data and the received video information in accordance with information indicative of a display priority order determined by a value providing the related data.

28. A method according to claim 27, wherein the receiver displays, as the display processing, synchronously an image indicative of information corresponding to the selected related data and the received video information.

29. A method according to claim 27, wherein the first and second utilization conditions include at least one of an age, a sex, an address, a hobby and a character of a user.

30. A method according to claim 27, wherein the first and second utilization conditions include an identifier for identifying a user.

31. A method according to claim 27, wherein the related data is the information to be displayed on the display device.

32. A method according to claim 27, wherein the related data includes data indicative of an access manner to the information to be displayed on the display device.

33. A method according to claim 32, wherein the data indicated by the access manner to the information includes URL on Internet.

34. A method according to claim 32, wherein the access manner to the information includes an access manner to a storage medium storing the information to be displayed on the display device.

35. A method of displaying video information on a display device included in a receiver broadcast from an information broadcasting apparatus, comprising:

(a) receiving the video information having a plurality of sequential images, a plurality of related data corresponding to a scene of the plurality of sequential images in the video information, and a plurality of first utilization conditions indicative of a characteristic of a user corresponding to the plurality of related data, respectively from the information broadcasting apparatus;

(b) comparing a second utilization condition indicative of characteristics of the user registered with the receiver and the plurality of first utilization conditions, respectively;

(c) selecting the related data corresponding to the first utilization condition further corresponding to the second utilization condition from the plurality of related data in accordance with the compared result obtained from the step (b); and (d) determining at least one related data among the selected related data in accordance with information indicative of a display priority order added to the selected related data when there is a plurality of the selected related data that conflict with other related data of the plurality of the selected related data;

(e) displaying, on the display device, information corresponding to the at least one related data determined by the step (d); and (f) storing related data among the selected related data, with the exception of the predetermined related data, in a storage device, wherein the display data priority order is determined by a value of providing the related data.

36. A method according to claim 35, wherein the step (e) is to store the predetermined related data in the storage device.

37. A method according to claim 36, wherein the step (e) includes a step (e1) comprising deleting the stored related data in the storage device from a lower order of information indicative of the priority order in a case of satisfying a predetermined condition.

38. A method according to claim 37, wherein the information indicative of the priority order is included in the first utilization condition and is determined by using at least one of an importance degree of the related data and a vector matching individual information and an advertisement.

39. A method according to claim 1, wherein the received first utilization condition further includes identification information for identifying related data corresponding to the plurality of related data an importance degree indicative of display magnitude.

40. A receiver having a display device for receiving video information broadcast from an information broadcasting apparatus and for displaying the received video information on the display device, comprising:

a receiver unit for receiving the video information having a plurality of sequential images broadcast from the information broadcasting apparatus, a plurality of related data corresponding to a scene of the plurality of sequential images in the video information, and a plurality of first utilization conditions indicative of a characteristic of a user corresponding to the plurality of related data, respectively;

a storage unit having a second utilization condition, previously stored, indicative of the characteristic of the user registered with the receiver;

a controller connected to said receive unit and said storage unit through signal lines, for comparing the second utilization condition with the plurality of first utilization conditions, respectively, and selecting the related data corresponding to the first utilization condition further corresponding to the second utilization condition from the plurality of data in response to a compared result;

a display control unit to control and display, on the display device, information corresponding to predetermined related data among the selected related data corresponding to the scene of the plurality of sequential images indicative of the received video information in accordance with information indicative of a display priority order added to the selected related data in a case where there are a plurality of the selected related data and the plurality of the selected related data conflict with one another; and a storage device for storing related data among the selected related data, with the exception of the predetermined related data, wherein the display data priority order is determined by a value of providing the related data.

41. A receiver according to claim 40, wherein the storage device stores the predetermined related data.

42. A receiver according to claim 41, wherein the stored related data in the storage device is deleted from a lower order of information indicative of the priority order in a case of satisfying a predetermined condition.

43. A receiver according to claim 42, wherein the information indicative of the priority order is included in the first utilization condition and is determined by using at least one of an importance degree of the related data and a vector matching of individual information and advertisement.

44. A receiver according to claim 9, wherein the received first utilization condition further includes identification information for identifying related data corresponding to the plurality of related data an importance degree indicative of display magnitude.

45. An information broadcasting apparatus for broadcasting video information to a plurality of receivers, comprising:

means for providing a correspondence to a scene of a plurality of sequential images in the video information and a plurality of related data related to the scene of the plurality of sequential images in the video information;

means for providing a correspondence to the plurality of related data and a plurality of first utilization conditions indicative of characteristics of users, respectively; and means for broadcasting the video information, the plurality of related data and the plurality of first utilization conditions to the plurality of receivers, wherein at least one of the plurality of receivers performs the following processing:

a processing means for comparing a second utilization condition, previously stored, indicative of the characteristic of the user registered with the receiver and the plurality of first utilization conditions, respectively;

a processing means for selecting the related data corresponding to the first utilization condition further corresponding to the second utilization condition from the plurality of data in accordance with a compared result;

a processing means for displaying, on the display device, information corresponding to predetermined related data among the selected related data corresponding to the scene of the plurality of sequential images indicative of the received video information in accordance with information indicative of a display priority order added to the selected related data in a case where there are plurality the selected related data and that conflict with other selected related data; and a storage device for storing related data among the selected related data, except the predetermined related data, wherein the display data priority order is determined by a value of providing the related data.

46. An information broadcasting apparatus according to claim 45, wherein the storage device stores the predetermined related data.

47. An information broadcasting apparatus according to claim 46, wherein the stored related data in the storage device is deleted from a lower order of information indicative of the priority order in a case of satisfying a predetermined condition.

48. An information broadcasting apparatus according to claim 47, wherein the information indicative of the priority order is included in the first utilization condition and is determined by using at least one of an importance degree of the related data and a vector matching individual information and an advertisement.

49. An information broadcasting apparatus according to claim 19, wherein the received first utilization condition further includes identification information for identifying related data corresponding to the plurality of related data an importance degree indicative of display magnitude.

* * * * *